United States Patent
Baranauskas et al.

(10) Patent No.: US 9,628,263 B2
(45) Date of Patent: Apr. 18, 2017

(54) SIGNAL DIGITIZER AND CROSS-CORRELATION APPLICATION SPECIFIC INTEGRATED CIRCUIT

(71) Applicants: Pacific MicroCHIP Corp., Culver City, CA (US); California Institute of Technology, Pasadena, CA (US)

(72) Inventors: Dalius Baranauskas, Culver City, CA (US); Gytis Baranauskas, Culver City, CA (US); Denis Zelenin, Culver City, CA (US); Pekka Kangaslahti, Culver City, CA (US); Alan B. Tanner, Culver City, CA (US); Boon H. Lim, Culver City, CA (US)

(73) Assignees: PACIFIC MICROCHIP CORP., Culver City, CA (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 337 days.

(21) Appl. No.: 14/505,428

(22) Filed: Oct. 2, 2014

(65) Prior Publication Data
US 2016/0099804 A1   Apr. 7, 2016

(51) Int. Cl.
G06G 7/32 (2006.01)
H04L 7/04 (2006.01)
H04B 7/185 (2006.01)
H04B 7/08 (2006.01)

(52) U.S. Cl.
CPC .......... *H04L 7/042* (2013.01); *H04B 7/0848* (2013.01); *H04B 7/185* (2013.01)

(58) Field of Classification Search
CPC ............ H04L 7/042; H04B 7/185; H04B 7/06
USPC ......................................................... 708/813
See application file for complete search history.

(56) References Cited

U.S. PATENT DOCUMENTS

| | | | |
|---|---|---|---|
| 4,097,801 A | 6/1978 | Freeman et al. | |
| 6,366,629 B1 * | 4/2002 | Chen | H04L 7/0029 348/21 |
| 6,861,978 B2 | 3/2005 | Lam | |
| 7,280,623 B2 | 10/2007 | Gupta et al. | |
| 7,532,663 B2 | 5/2009 | Lewis | |

(Continued)

OTHER PUBLICATIONS

International Application No. PCT/US2015/053601 filed Oct. 1, 2015, PCT International Search Report and the Written Opinion of the International Searching Authority dated Jan. 19, 2016.

*Primary Examiner* — Tan V. Mai
(74) *Attorney, Agent, or Firm* — Blakely Sokoloff Taylor & Zafman LLP

(57) ABSTRACT

According to one embodiment, a cross-correlator comprises a plurality of analog front ends (AFEs), a cross-correlation circuit and a data serializer. Each of the AFEs comprises a variable gain amplifier (VGA) and a corresponding analog-to-digital converter (ADC) in which the VGA receives and modifies a unique analog signal associates with a measured analog radio frequency (RF) signal and the ADC produces digital data associated with the modified analog signal. Communicatively coupled to the AFEs, the cross-correlation circuit performs a cross-correlation operation on the digital data produced from different measured analog RF signals. The data serializer is communicatively coupled to the summing and cross-correlating matrix and continuously outputs a prescribed amount of the correlated digital data.

12 Claims, 21 Drawing Sheets

(56) References Cited

U.S. PATENT DOCUMENTS

| | | |
|---|---|---|
| 8,362,953 B2 | 1/2013 | Srikantiah et al. |
| 8,576,116 B2 | 11/2013 | Matsuo |
| 8,774,329 B2 | 7/2014 | Kawaguchi |
| 2002/0064214 A1 | 5/2002 | Hattori et al. |
| 2010/0056083 A1* | 3/2010 | Kim ........................ H04B 17/21 455/115.1 |
| 2010/0067625 A1 | 3/2010 | Sankabathula et al. |
| 2012/0140858 A1 | 6/2012 | Roh et al. |
| 2014/0219320 A1 | 8/2014 | Germain |

* cited by examiner

SIGNAL DIGITIZER AND CROSS-CORRELATION APPLICATION SPECIFIC INTEGRATED CIRCUIT

STATEMENT REGARDING FEDERALLY SPONSORED RESEARCH AND DEVELOPMENT

The invention described herein was made in the performance of work under a NASA contract, and is subject to the provisions of Public Law 96-517 (35 USC 202) in which the Contractor has elected to retain title.

FIELD

Embodiments of the disclosure relate to the field of electronic components. More specifically, one embodiment of the disclosure relates to a signal digitizer and cross-correlator that digitizes incoming analog signals and cross-correlates the digitized signals through summing logic and a cross-correlation matrix, where the cross-correlated results are read out as serialized output data.

GENERAL BACKGROUND

Over the last decade or so, greater efforts have been made to conduct more detailed geosynchronous satellite observations in efforts to understand the effects of global warming as well as to assist in the prediction of weather and climate changes that, in many situations, can save hundreds or thousands of lives. In general, geosynchronous satellite observations involve a measurement of different frequency bands associated with microwave signals radiating from the Earth. The data associated with these frequency bands constitute weather and climate information. "Weather" involves measurements of planetary conditions that are highly dynamic and local in scale, such as precipitation or humidity (e.g., an amount of water vapor in a selected portion of the atmosphere), temperature, cloud formations, or the like. "Climate" involves the measurement of planetary conditions that are less dynamic and more global in scale, such as ground temperature, salt content (salinity) in oceans, or the like.

It is evident that the reliability and accuracy of weather predictions and climate change monitoring are based, at least in part, on an ability to obtain, store and transmit weather and climate information for subsequent analysis. Stated differently, an ability to obtain, store and subsequently transmit a greater amount of weather and climate information improves the reliability and accuracy in the reporting of these events.

According to a simplistic view, one may argue that, by significantly increasing the amount of storage memory deployed within a satellite, reliability and accuracy in weather and climate predictions may be improved. However, satellites in space are constantly being bombarded by charged particles that can induce changes in the data content of semiconductor memories. This phenomenon is commonly referred to as a "single event upset" or "SEU". Hence, the deployment of greater and greater amounts of memory, without a scheme for cross-correlating and compressing the data, not only requires increased complexity in handling SEUs, but also greatly increases the overall costs associated with the satellite (e.g., increased metal shielding, increased launch weight, increased memory costs, etc.) and may even result in the transmission of less reliable data.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the disclosure relate to a system, electronic component and method for conducting a cross-correlation analysis of incoming data, where the cross-correlated data is serialized and re-transmitted for further processing. According to one embodiment of the disclosure, the electronic component is implemented as part of a satellite data analysis system, which is configured to measure weather and/or climate information, such as temperature and atmospheric water-vapor levels at different regions of the Earth for example, from a geosynchronous orbit. For this embodiment, the electronic component features an application specific integrated circuit (ASIC) that, when operating in a first (Correlation) mode, provides input data sampled by one or more satellite receivers by (i) digitalizing incoming analog radio frequency (RF) components, (ii) summing of digitized RF components, and/or (iii) cross-correlating the RF digitized components to produce resultant data that signifies the similarities and differences between observed RF components. When operating in a second (Read-Out) mode, the electronic component refrains from processing the input data, but rather, reads out the resultant data from logic in the ASIC. The resultant data may be serialized for reliable transmission.

More specifically, according to a specific embodiment of the disclosure, the electronic component features a signal digitizer and cross-correlation ASIC that is adapted to (i) digitize a plurality of analog signals (e.g., 128 analog signals) at a prescribed frequency (e.g., one gigahertz "GHz" samples per second with 2-bit accuracy), (ii) cross-correlate a first subset of the plurality of the digitized signals (e.g. 64 digitized signals) from a first source synchronously with a second subset of the plurality of digitized signals (e.g. other 64 digitized signals) from a second source, and (iii) serialize and output the resultant, cross-correlated data through a multi-bit bus (e.g., 8-bit bus). This ASIC solves a number of disadvantages by achieving low-power usage and maintaining a large amount of weather and/or climate information (e.g., temperature and/or water vapor data) associated with the analog signals that are sampled by different receivers of the satellite, while compressing the weather and/or climate information to an amount that can easily be transmitted back to Earth for further processing. The cross-correlation improves overall accuracy of the data by reducing both false positive and false negative events.

Figure 7:
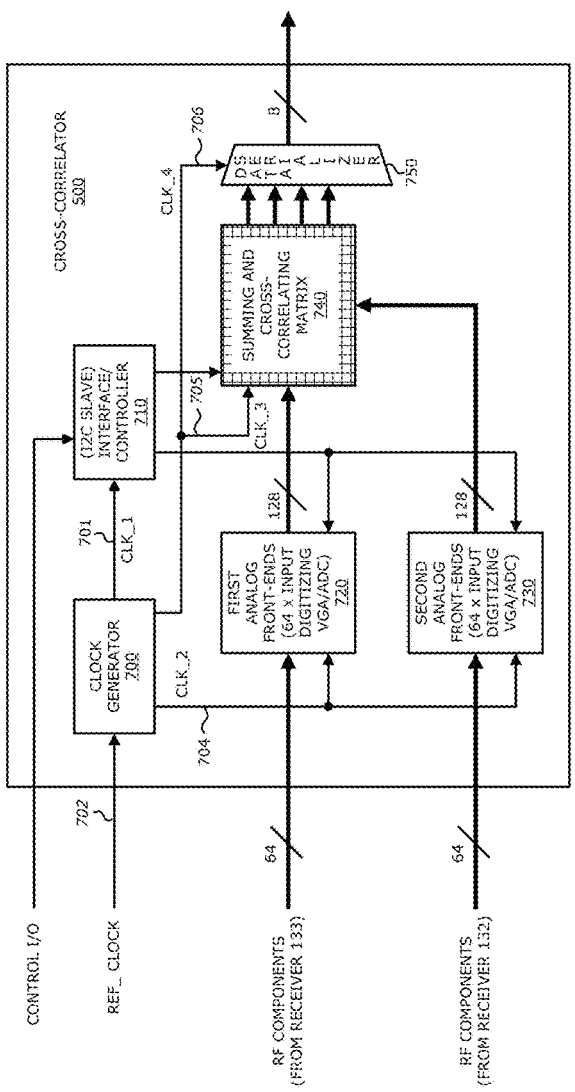
FIG. 7 is a first illustrative embodiment of a general architecture of a cross-correlator that is part of the cross-correlation system of FIG. 5.
Figure 9:
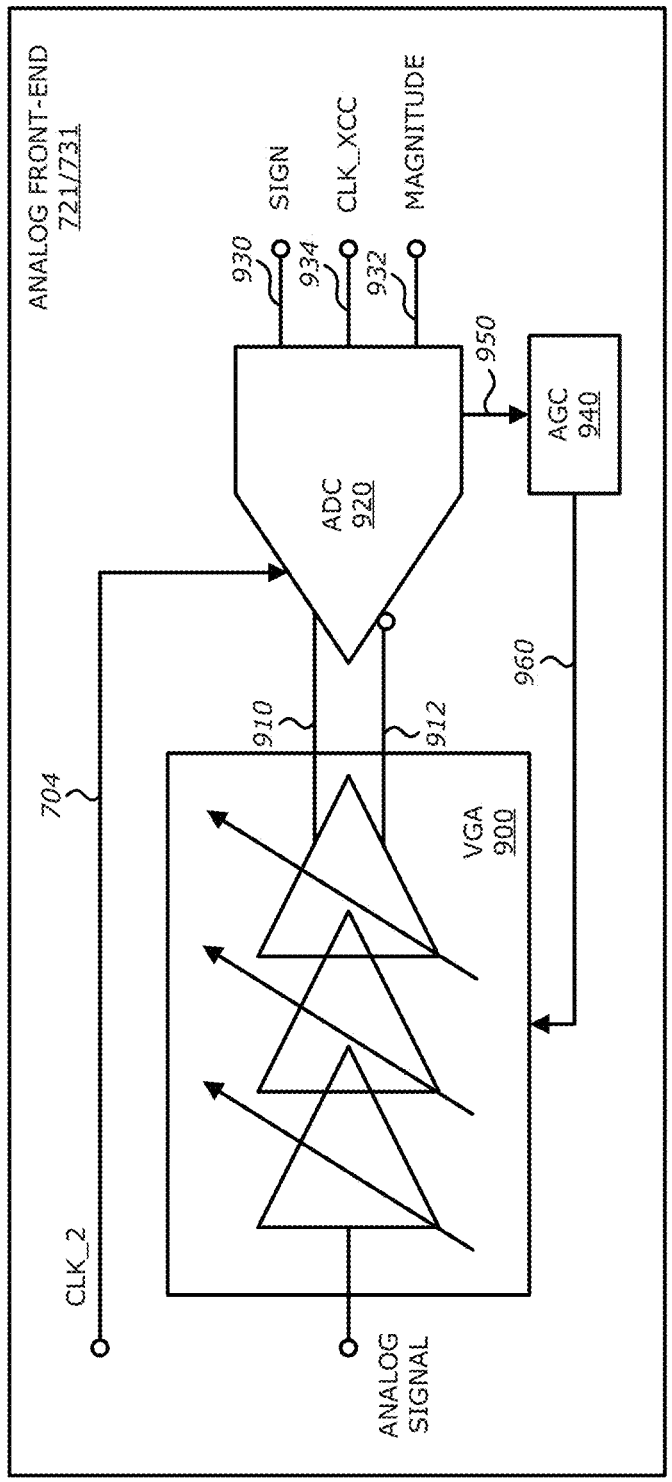
FIG. 9 is an illustrative embodiment of an AFE forming part of the cross-correlator of FIG. 7 is shown.

According to one of the illustrative embodiments of the disclosure, as illustrated in detail in FIG. 7, the signal digitizer and cross-correlation ASIC comprises digitizing, analog front-ends (AFEs) communicatively coupled to a summing and cross-correlating matrix. Each of the analog inputs directed to the ASIC from a distinct receiver are provided to a corresponding AFE, which includes a VGA (Variable Gain Amplifier) and ADC (Analog-to-Digital Converter) with automated gain control loops as shown in FIG. 9. The AFE outputs two digitalized signals associated with the RF component that collectively formulate a value (e.g., "00", "01", "10" or "11") and the number of occurrences of these different values are cross-correlated through summing and accumulation operations as described below and illustrated in FIGS. 13-17. The cross-correlated data can be used to generate a brightness image of weather and/or climate conditions (e.g., temperature and/or the water vapor content in the atmosphere) using a Fourier-transform algorithm.

I. Terminology

In the following description, certain terminology is used to describe aspects of the invention. For example, in certain situations, the term "logic" is representative of hardware, firmware and/or software that is configured to perform one or more functions. As hardware, logic may include circuitry having signal processing or storage functionality. Examples of such circuitry may include, but is not limited or restricted to the following: a video graphics array, a programmable gate array, a microcontroller, circuitry within an application specific integrated circuit, receiver, transmitter and/or transceiver circuitry, semiconductor memory, and/or combinatorial logic.

The term "interconnect" is a physical or logical communication path within a communication device, which is an electronic device with data processing and/or network connectivity such as, for example, a satellite, a server; a computer, electronic weather instruments, or the like. For instance, the communication path may be provided through wired connections (e.g., electrical wiring, optical fiber, cables, bus traces, etc.) and/or wireless connections (e.g., a wireless channel using infrared, radio frequency "RF", or other wireless signaling mechanism).

The term "computerized" generally represents that any corresponding operations are conducted by hardware in combination with software and/or firmware. Also, a "sequence" of element generally relates a plurality of elements although, in some case, a sequence may be broadly defined as including a single element.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Figure 1:
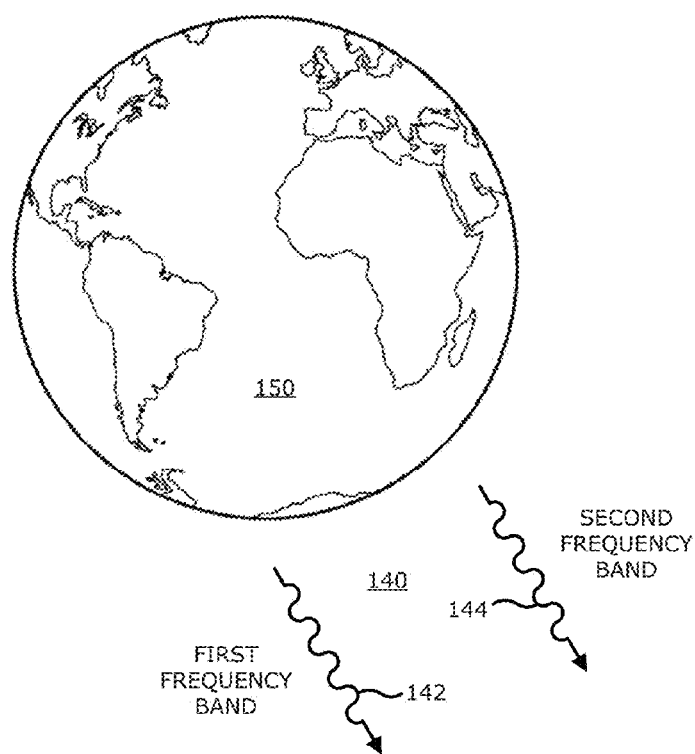
FIG. 1 is an exemplary block diagram of a communication device deploying an embodiment of the invention.
Figure 1:
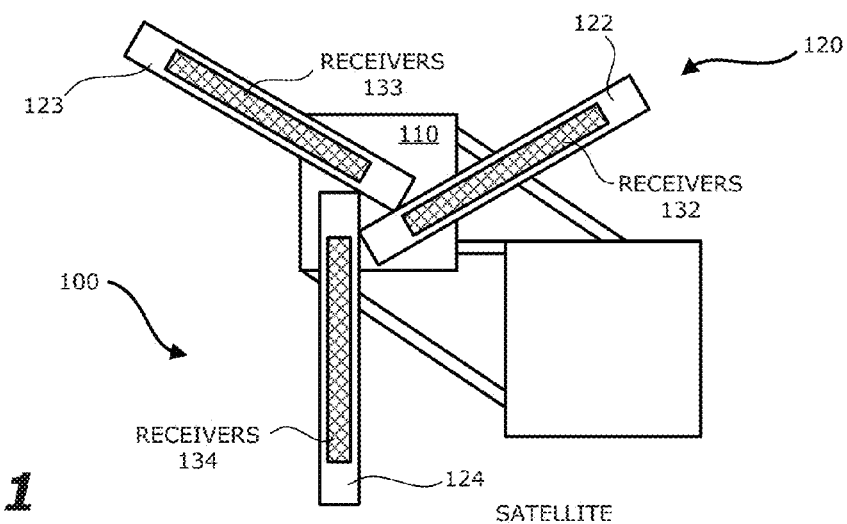

Referring to FIG. 1, an exemplary block diagram of a communication device 100 deploying an embodiment of the invention is shown. As shown, the communication device 100 is featured as a satellite placed in a geosynchronous orbit around a celestial body 150 such as the Earth, although it is contemplated that the digitizing and cross-correlating logic described herein may be implemented in other types of electronic devices. For this embodiment of the disclosure, the satellite 100 comprises a chassis 110 and one or more arms 120, referred to as "arm(s)" 120. In general, the arm(s) 120 operate to receive electromagnetic waves (e.g., radio frequency "RF" signals) at a certain frequency as input and convert each of these input signals into RF components that are easier to process.

More specifically, as shown in FIG. 1, each of the arms 122-124 comprises a plurality of receivers 132-134 (e.g., 128 receivers for each arm), which are configured to monitor for one or more types of RF signals 140 within one or more frequency bands, such as microwave signals for example. The RF signals having different frequency bands can be used to obtain information associated with different weather and climate characteristics. For example, the receivers 132-134 may be configured to monitor RF signals 142 of a first frequency band ranging from 180 gigahertz (GHz) to 190 GHz (e.g., 183 GHz) to capture image information associated with atmospheric water vapor. Additionally or in the alternative, the receivers 132-134 may be configured to monitor RF signals 144 of a second frequency band ranging from 50-60 GHz to capture image information associated with temperature of the Earth's ground surface. As yet another alternative, although not shown, the receivers 132-134 may be configured to monitor one or more RF signals of other frequency bands such as a third frequency band ranging from 1-2 GHz to capture image information associated with the salinity of a particular ocean or sea.

Figure 2:
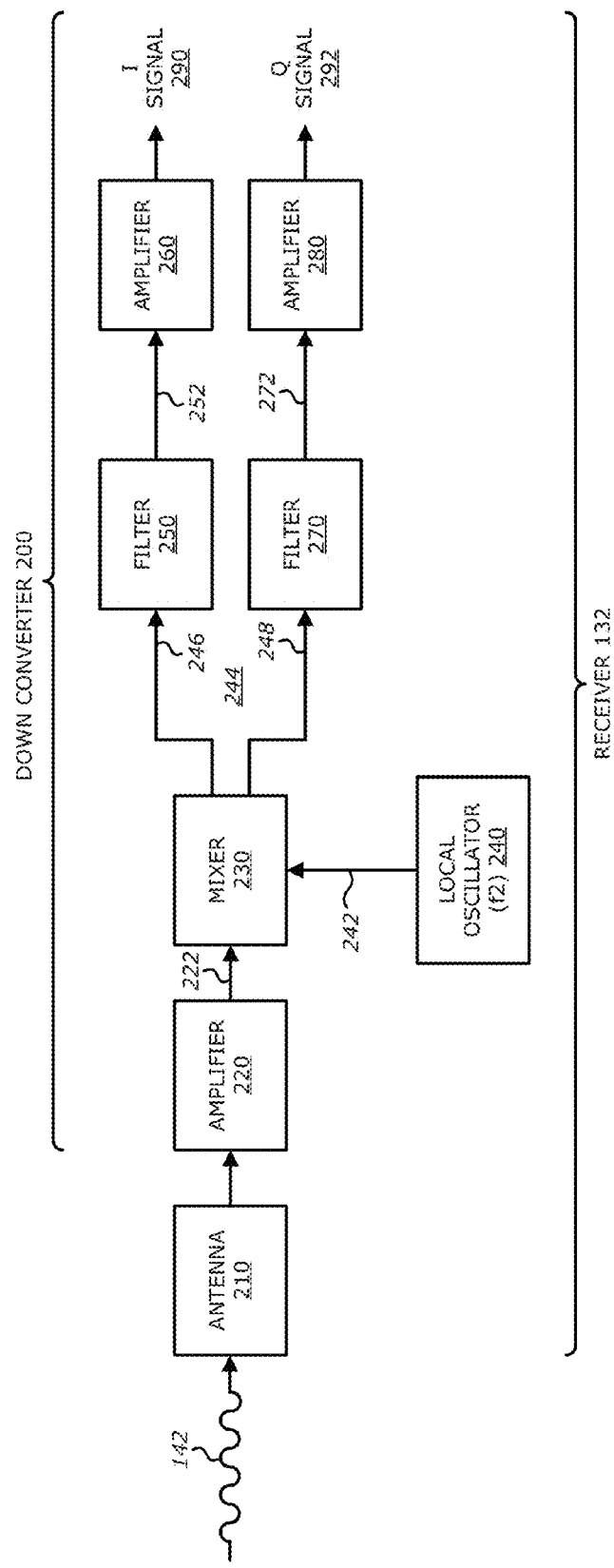
FIG. 2 is an illustrative embodiment of a receiver deployed as part of the communication device of FIG. 1.

Referring now to FIG. 2, an illustrative embodiment of the receiver 132 deployed as part of the arm 122 of FIG. 1 is shown. Herein, the receiver 132 at least partially operates as a down-converter 200 that receives a RF signal of a particular frequency range (e.g., RF signal 142), which constitutes a sinusoid signal with angular modulation, and decomposes the incoming RF signal 142 to produce corresponding RF components, namely in-phase (I) and quadrature (Q) components 290 and 292. These I and Q components 290 and 292 are supplied to different cross-correlation cells which conduct cross correlation operations as described below.

More specifically, as illustrated in FIG. 2, the receiver 132 comprises an antenna 210, which is tuned to receive the RF signal 142 and provide the signal to an amplifier 220. The amplifier 220 increases a power level of the RF signal 142 and provides the amplified signal 222 to a mixer 230. The mixer 230 combines the amplified signal 222 having a first frequency (f1) within the particular frequency range with a signal 242 having a second frequency (f2) from a local oscillator 240 to produce one or more composite output signals 244 such as a first composite signal 246 and a second composite signal 248. The second frequency (f2) may be a factor of the first frequency (f1), such as f2=x·f1, where x>0. For this illustrative embodiment, f1 is equal to one-half of f2 (½ f2).

As shown, the first composite signal 246 is provided to a first filter 250, which operates as a low-pass filter that (i) attenuates a portion of the first composite signal 246 that has a frequency higher than a first selected cutoff frequency and (ii) passes the attenuated signaling 252 associated with the first composite signal 246 that has a frequency lower than the cutoff frequency to an amplifier 260. The amplifier 260 produces the in-phase (I) component 290. Similarly, the second composite signal 248 is provided to a second filter 270, which also operates as a low-pass filter that attenuates a portion of the second composite signal 248 that has a frequency higher than a selected cutoff frequency, which may be the same or different than the cutoff frequency associated with the first filter 250. The second filter 270 further passes the attenuated signaling 272 associated with the second composite signal 248 that has a frequency lower than its cutoff frequency to the amplifier 280. The amplifier 280 produces the quadrature (Q) component 292. The IQ components 290 and 292 are routed to different cross-correlation ASICs as shown in FIG. 3.

Figure 3:
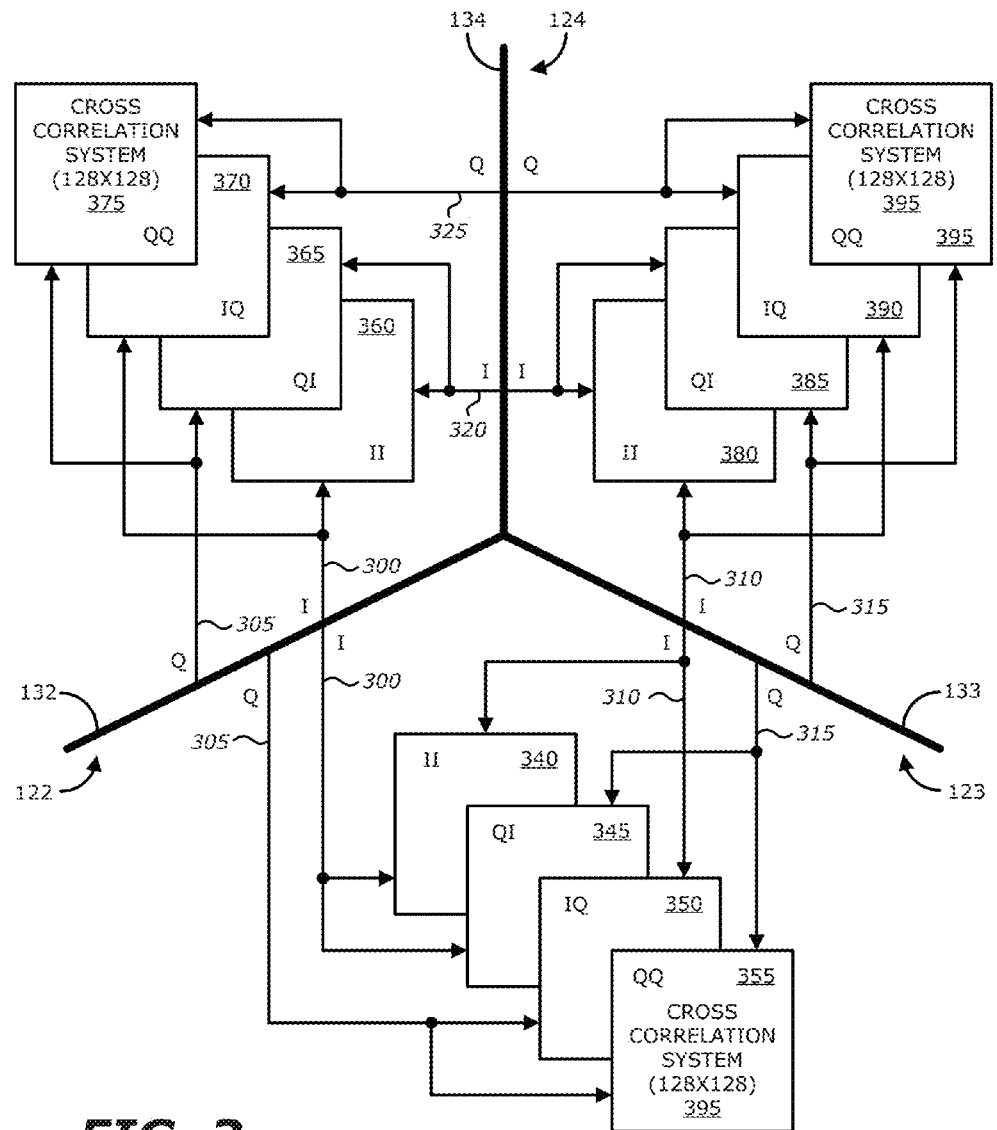
FIG. 3 is a general illustrative embodiment of propagation paths of the IQ components of groups of receivers distributed to a plurality of cross-correlation systems.

Referring now to FIG. 3, a general illustrative embodiment of the propagation paths of the IQ components of groups of receivers 132-134 associated with arms 122-124 is shown. According to this embodiment of the disclosure, a first plurality of receivers 132 is deployed as part of the first arm 122. Similarly, a second plurality of receivers 133 and a third plurality of receivers 134 are deployed as part of the second arm 123 and the third arm 124, respectively. In order to enhance the accuracy of resultant image data, a number of cross-correlation systems 340-395 are deployed within the chassis 110 of the satellite 100 of FIG. 1 and are configured to receive I or Q components from receivers 132-134 associated with different arms 122-124.

For instance, as a simple illustrative example throughout the specification, cross-correlation analysis of I components from receivers 132 of the first arm 122 (sometimes represented as "Arm1I[ . . . ]") and I components from receivers 133 of the second arm 123 (sometimes represented as "Arm2I[ . . . ]") is described for clarity sake. Of course, it is contemplated that multiple cross-correlation operations may be conducted between (1) a subset of I or Q components from a first selected receiver 132, 133 or 134 and (2) a subset of I or Q components from a second selected receiver 132, 133 or 134, which is different from the first selected receiver 132, 133 or 134.

According to this embodiment of the disclosure, the I components 300 generated from a detected RF signal by receivers 132 from the first arm 122 are provided to a cross-correlation system 340 that performs cross-correlation with respect to I components 310 generated from a detected RF signal by receivers 133 associated with the second arm 123. Similarly, the I components 300 generated by the receivers 132 are provided to a cross-correlation system 345 that performs cross-correlation with respect to Q components 315 associated with the second arm 123. In addition, the I components 300 generated by the receivers 132 are provided to a cross-correlation system 360 that performs cross-correlation with respect to I components 320 associated with the third arm 124. Also, the I components 300 generated by the receivers 132 are provided to a cross-correlation system 370 that performs cross-correlation with respect to Q components 325 associated with the third arm 124.

As further shown in FIG. 3, the I components 310 generated from a detected RF signal by receivers 133 from the second arm 123 are provided to a cross-correlation logic 350 that performs cross-correlation with respect to Q components 305 associated with the first arm 122. In addition, the I components 310 generated by the receivers 133 from the second arm 123 are provided to (i) a cross-correlation system 380 that performs cross-correlation with respect to I components 320 associated with the third arm 124 and a cross-correlation system 390 that performs cross-correlation with respect to Q components 325 associated with the third arm 124.

The I components 320 generated from a detected RF signal by receivers 134 from the third arm 124 are provided to a cross-correlation system 365 that performs cross-correlation with respect to Q components 305 associated with the first arm 122. In addition, the I components 320 generated by the receivers 134 from the third arm 124 are provided to a cross-correlation system 385 that performs cross-correlation with respect to Q components 315 associated with the second arm 123.

Lastly, the Q components 305 generated from a detected RF signal by the receivers 132 from the first arm 122 are provided to cross-correlation system 355 that performs cross-correlation with respect to Q components 315 associated with the second arm 123. Similarly, the Q components 305 generated by the receivers 132 are provided to cross-correlation system 375 that performs cross-correlation with respect to Q components 325 associated with the third arm 124, and the Q components 315 generated by the receivers 133 are provided to a cross-correlation system 395 that performs cross-correlation with respect to Q components 325 associated with the third arm 124.

Figure 4:
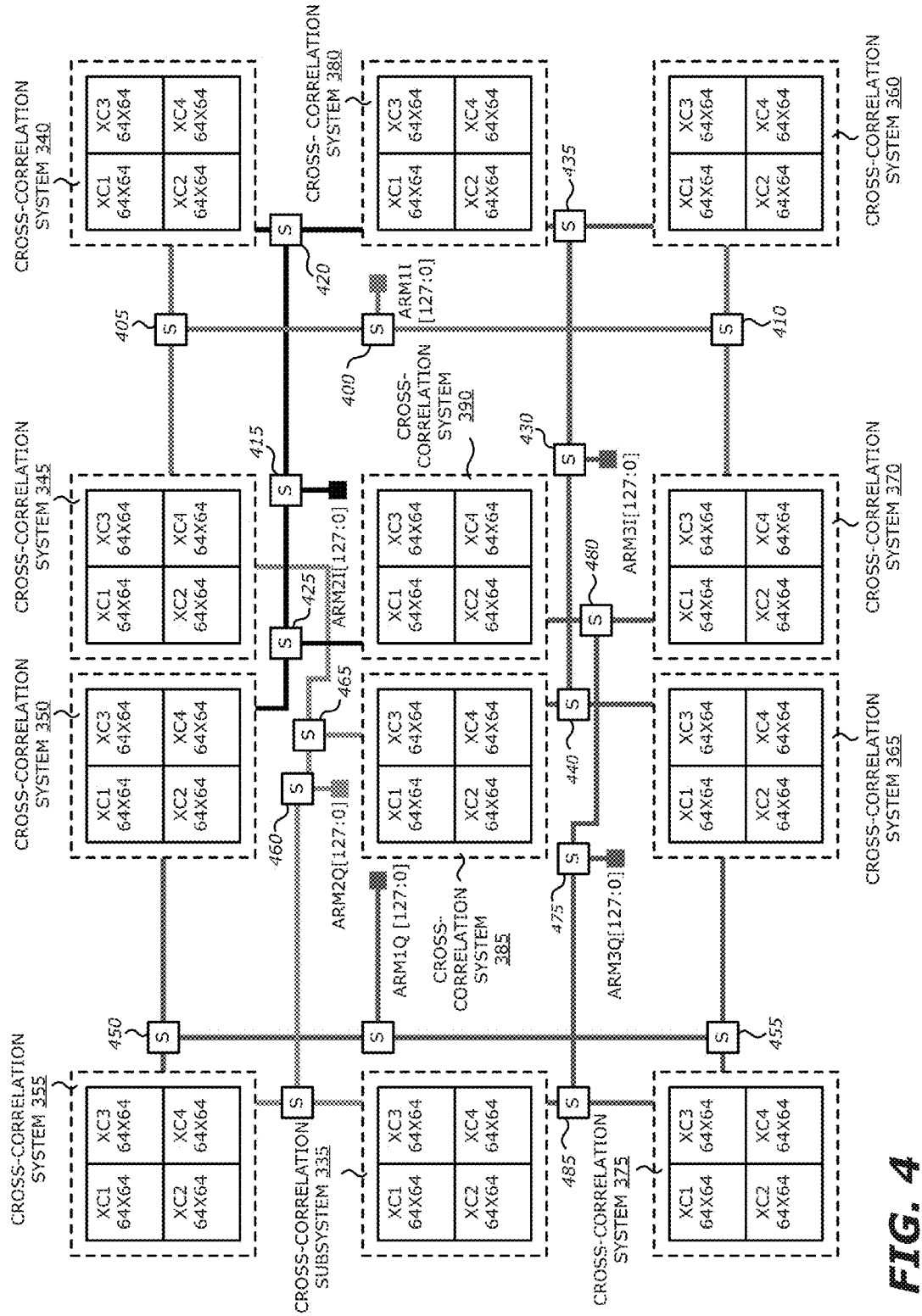
FIG. 4 is a more detailed illustrative embodiment of the propagation paths of the IQ components from the groups of receivers distributed to the plurality of cross-correlation systems of FIG. 3.

Referring now to FIG. 4, a more detailed illustrative embodiment of the propagation paths of the IQ components from the receivers 132-134 between the cross-correlation systems 340-395 of FIG. 3 is shown. Herein, the I components (e.g., Arm1I[127:0]) 300 from the first receivers 132 are provided to a splitter 400 that routes the I components 300 to splitters 405 and 410. Splitter 405 routes the I components 300 to both cross-correlation systems 340 and 345 while splitter 410 routes the I components 300 to both cross-correlation systems 360 and 370. The I components 310 (e.g., Arm2I[127:0]) from the second receivers 133 are provided to a splitter 415, which routes the I components 310 to splitters 420 and 425. Splitter 420 routes the I components 310 to both cross-correlation systems 340 and 380 while splitter 425 routes the I components 310 to both cross-correlation systems 350 and 390. The I components 320 (e.g., Arm3I[127:0]) from the third receivers 134 are provided to a splitter 430, which routes the I components 320 to splitters 435 and 440. Splitter 435 routes the I components 320 to both cross-correlation systems 360 and 380 while splitter 440 routes the I components 320 to both cross-correlation systems 365 and 385.

As further shown in FIG. 4, the Q components (e.g., Arm1Q[127:0]) 305 from the first receivers 132 are provided to a splitter 445 that routes the Q components 305 to splitters 450 and 455. Splitter 450 routes the Q components 305 to both cross-correlation systems 350 and 355 while splitter 455 routes the Q components 305 to both cross-correlation systems 365 and 375. The Q components (e.g., Arm2Q[127:0]) 315 from the second receivers 133 are provided to a splitter 460, which routes the Q components 315 to splitters 465 and 470. Splitter 465 routes the Q components 315 to both cross-correlation systems 345 and 385 while splitter 470 routes the Q components 315 to both cross-correlation systems 355 and 395. The Q components (e.g., Arm3Q[127:0]) 325 from the third receivers 134 are provided to a splitter 475, which routes the Q components 325 to splitters 480 and 485. Splitter 480 routes the Q components 325 to both cross-correlation systems 370 and 390 while splitter 485 routes the Q components 325 to both cross-correlation systems 375 and 395. Depending on the number of receivers associated with each arm (e.g., 128 receivers) which causes the cross-correlation systems 345-395 to have a sizing of 128×128, four cross-correlators (e.g., 64×64 cross-correlators) are deployed for each cross-correlation system 345-395, as illustrated in more detail in FIG. 5.

Figure 5:
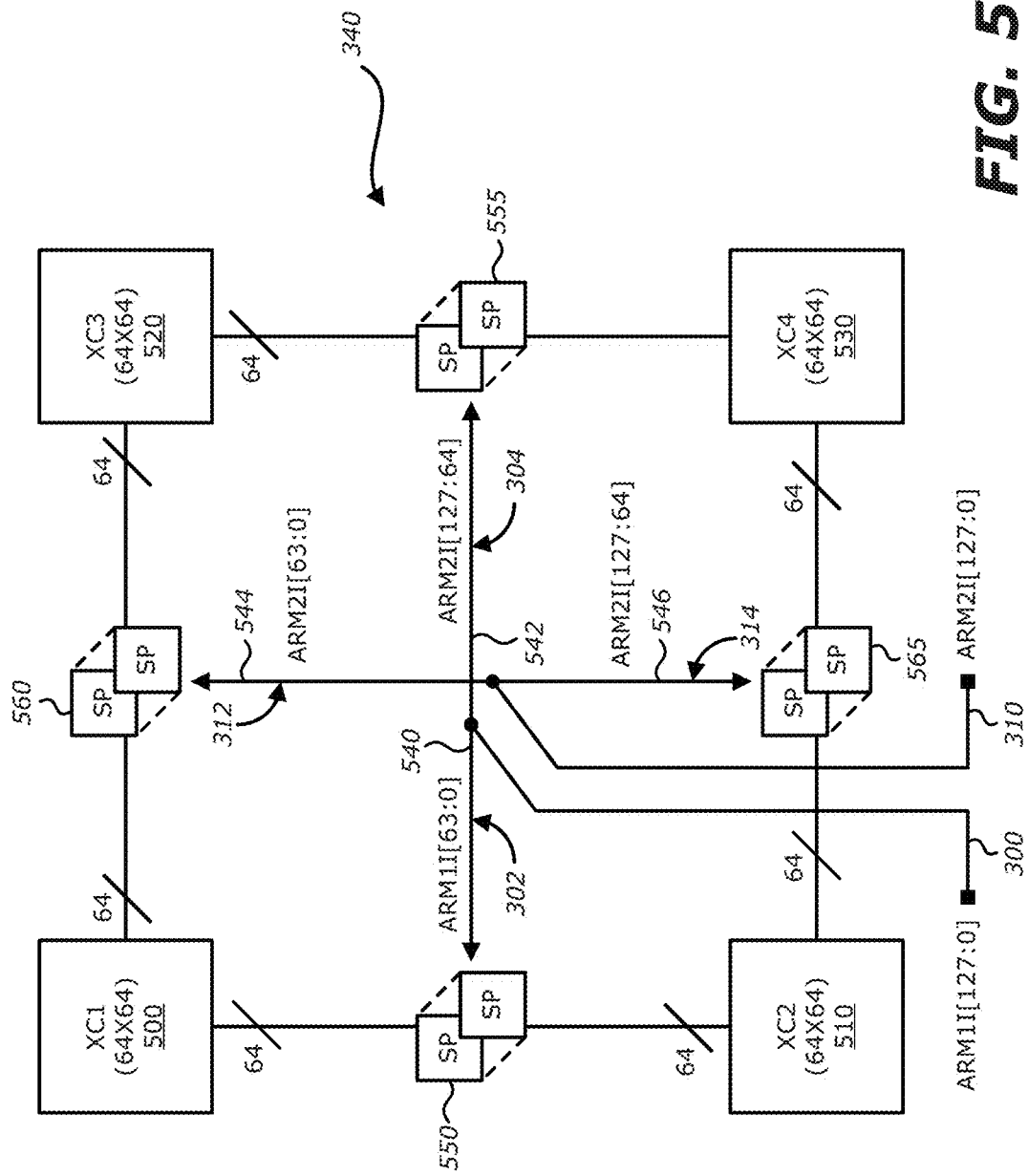
FIG. 5 is an illustrative embodiment of a first cross-correlation system that receives RF components from first and second sources.

Referring to FIG. 5, an illustrative embodiment of the first cross-correlation system 340 that receives I components 300 from the first arm 122 and I components 310 from the second arm 123 is shown. Herein, the I components 300 comprise a first group 302 of I components 300, which is represented as "Arm 1I[63:01]" 302, and a second group 304 of I components 300 that is represented as "Arm1I[127:63]" 304. Also, the I components 310 comprise a first group 312 of I components 310, which is represented as "Arm2I[63:0]" 312, and a second group 314 of I components 310 that is represented as "Arm2I[127:63]" 314.

As shown, the first cross-correlation system 340 comprises a first cross-correlator (XC1) 500, a second cross-correlator (XC2) 510, a third cross-correlator (XC3) 520, and a fourth cross-correlator (XC4) 530. According to one embodiment of the disclosure, as represented in FIG. 7, each of these cross-correlators (XC1-4) 500, 510, 520 and 530 may be implemented as an application specific integrated circuit (ASIC), which includes a plurality of variable gain amplifiers (VGAs) along with a corresponding plurality of analog-to-digital converters (ADCs), a summing and cross-correlating matrix, and a data serializer.

Arm1I[63:0] 302 is provided to a first internal splitter 550 via a first interconnect 540 while Arm1I[127:64] 304 is provided to a second internal splitter 555 via a second interconnect 542. Arm2I[63:0] 312 is provided to a third internal splitter 560 via a third interconnect 544 while Arm2I[127:64] 314 is provided to a fourth internal splitter 565 via a fourth interconnect 546. As a result, the first cross-correlator 500 receives the Arm1I[63:0] 302 from the first splitter 550 and Arm2I[63:0] 312 from the third splitter 560. Similarly, the second XCC 510 receives the Arm1I[63:0] 302 from the first splitter 550 and Arm2I[127:64] 314 from the fourth splitter 565; the third XCC 520 receives the Arm1I[127:64] 304 from the second splitter 555 and Arm2I[63:0] 312 from the third splitter 560; and the fourth XCC 530 receives the Arm1I[127:64] 304 from the second splitter 555 and Arm2I[127:64] 314 from the fourth splitter 565.

Figure 6A:
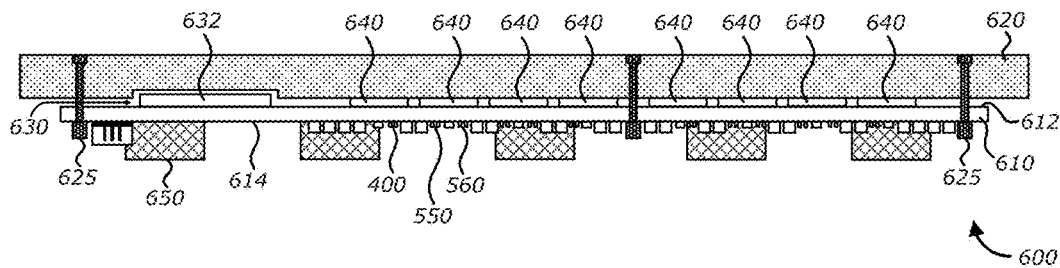
FIG. 6A is an illustrative embodiment of a cross-sectional view of a satellite data analysis system implementing the cross-correlation systems of FIG. 4.

Referring to FIG. 6A, an illustrative embodiment of a cross-sectional view of a satellite data analysis system 600 implementing, at least in part, the cross-correlation systems 345-395 is shown. Herein, the analysis system 600 features a printed circuit board 610 and a heat sink 620, which is coupled to the printed circuit board 610 through mounting fasteners 625 and is positioned over components mounted on a top surface 612 of the printed circuit board 610. As a result, the heat sink 620 receives and radiates heat produced by the mounted components which may include, but is not limited or restricted to processing logic 630 (e.g., field-programmable gate array "FPGA" 632 and/or board controller 634) and a plurality of cross-correlators 640.

Figure 6B:
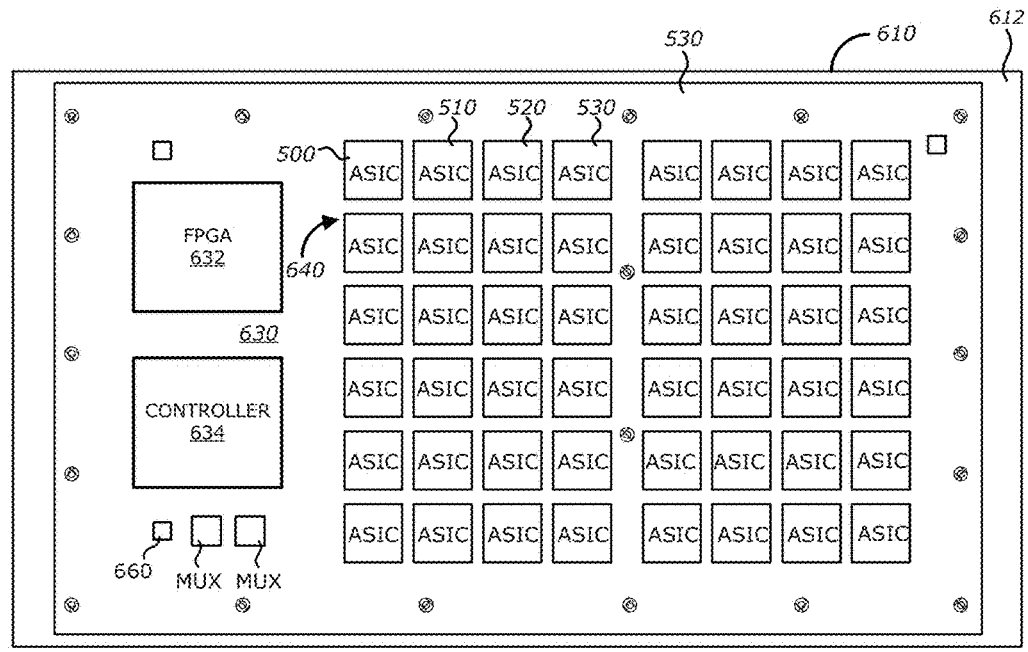
FIG. 6B is a planar view of a top surface of the printed circuit board associated with the satellite data analysis system of FIG. 6A.

As shown to FIG. 6B, a planar view of the top surface 612 of the printed circuit board 610 associated with the analysis system 600 of FIG. 6A is shown. Herein, the FPGA 632 and the board controller 634 are mounted on the top surface 612 of the printed circuit board 610 and are communicatively coupled to the plurality of cross-correlators 640. According to one embodiment of the disclosure, the FPGA 632 is responsible for performing post processing of cross-correlated data produced by the cross-correlators 640. In contrast, the board controller 634 is used to control and monitor operations of the cross-correlators 640 as well as control programming of the FPGA 632.

The plurality of cross-correlators 640 may be implemented as ASICs with four of these cross-correlators 640 (e.g., the first cross-correlator 500, the second cross-correlator 510, the third cross-correlator 520 and the fourth cross-correlator 530) collectively forming a cross-correlation system (e.g., first cross-correlation system 340) of FIG. 3. More specifically, each of the plurality of cross-correlators 640 may be implemented as a 64×64 cross-correlator ASIC. Hence, as shown, forty-eight (48) 64×64 cross-correlator ASICs are deployed to handle cross-correlation operations associated with 128-bit I and Q components from receivers associated with arms 122-124 of FIG. 1.

Figure 6C:
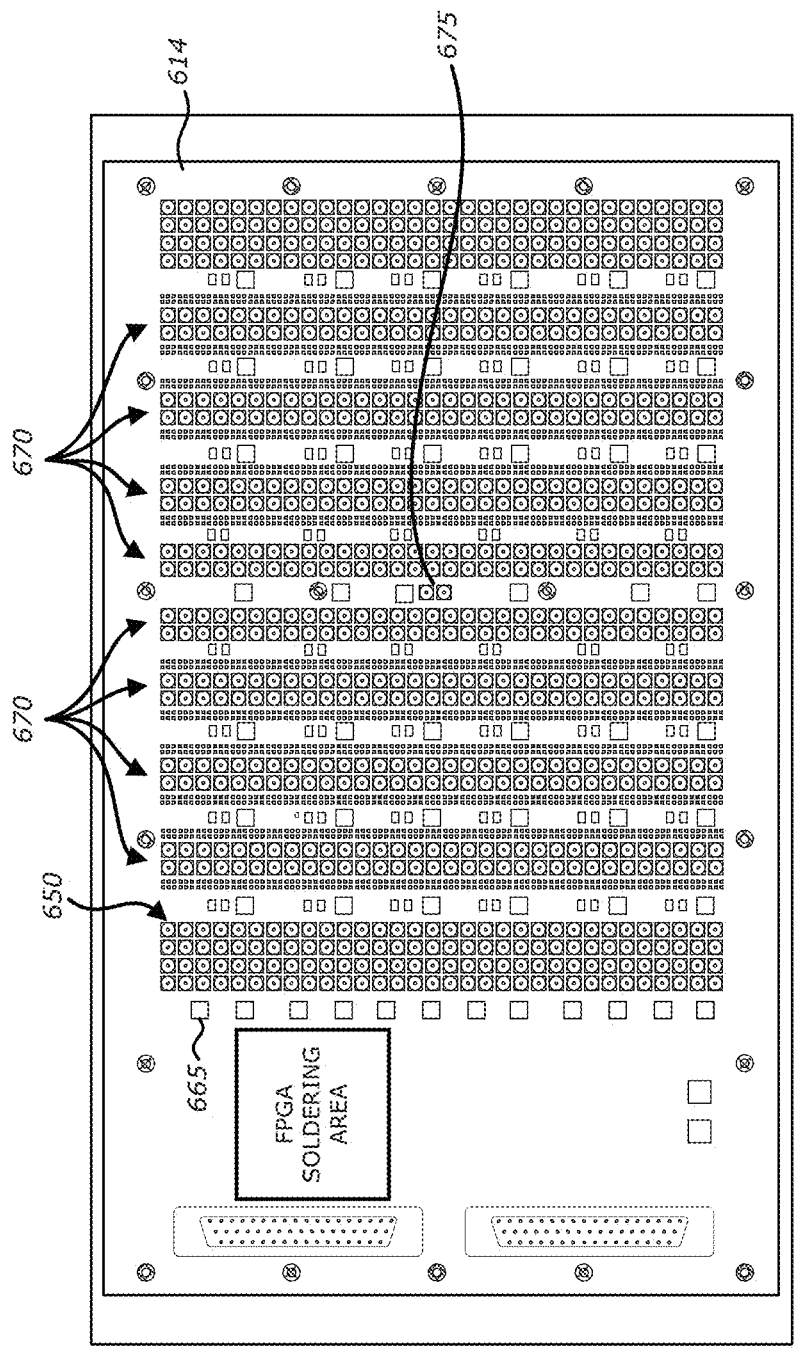
FIG. 6C is a planar view of a bottom surface of the printed circuit board associated with the satellite data analysis system of FIG. 6A.

Mounted on a bottom surface 614 of the printed circuit board 610, as shown in FIG. 6A and/or FIG. 6C, one or more power connectors 650 may be implemented to provide an interface for a power supply, where the supplied power may be adjusted through one or more direct current (DC) converters (e.g., DC-to-DC converter 660 of FIG. 6B) and/or voltage regulators (e.g., Low-Dropout "LDO" converters 665 of FIG. 6C) mounted to the printed circuit board 610. Additionally, a first input signal connector 670 may be implemented in order to provide an interface for receipt of in-phase and quadrature (I & Q) components from the receivers 132-134 associated with arms 122-124 of FIG. 1 while a second input signal connector 675 may be implemented to provide an interface for a reference clock (e.g. 1 GHz clock). Splitters 400-485 of FIG. 4 for routing IQ components between cross-correlation systems 340-395 and splitters 550-565 of FIG. 5 for routing IQ components between the cross-correlators 500-530 within the first cross-correlation system 340 may be mounted to the bottom surface 614 of the printed circuit board 610.

Referring now to FIG. 7, a first illustrative embodiment of a general architecture of the first cross-correlator 500 of FIG. 5, which is one of the plurality of cross-correlators 640 of FIG. 6, is shown. The first cross-correlator 500 comprises a clock generator 700, an interface (e.g., I²C slave) controller 710, a first plurality of analog front ends (AFEs) 720, a second plurality of AFEs 730, a summing and cross-correlating matrix 740 and a data serializer 750. Of course, it is contemplated that the architecture of the first cross-correlator 500 may be common for all of the plurality of cross-correlators 640.

Herein, the clock generator 700 receives a reference clock "REF_CLK" signal 702 and distributes secondary clock signals 703-706, which are based on the REF_CLK signal, to logic within the first cross-correlator 500 that requires clocking. These secondary clock signals (CLK_1, CLK_2, CLK_3, CLK_4) may have the same operating frequency as REF_CLK signal 702 or may be a derivation of REF_CLK signal 702. For instance, as shown in FIG. 7 where the REF_CLK signal 702 is selected as a 1 GHz clock, the clock generator 700 produces one or more clock signals (e.g., CLK_2 signal) 704 that is used by the first plurality of AFEs 720 and the second plurality of AFEs 730. More specifically, the clock generator 700 may be configured to provide synchronous, separate clock signals to the first plurality of AFEs 720 and the second plurality of AFEs 730 through a distributed interconnect scheme, where an illustrative example of the distributed interconnect scheme 800 is shown in FIG. 8.

Figure 8:
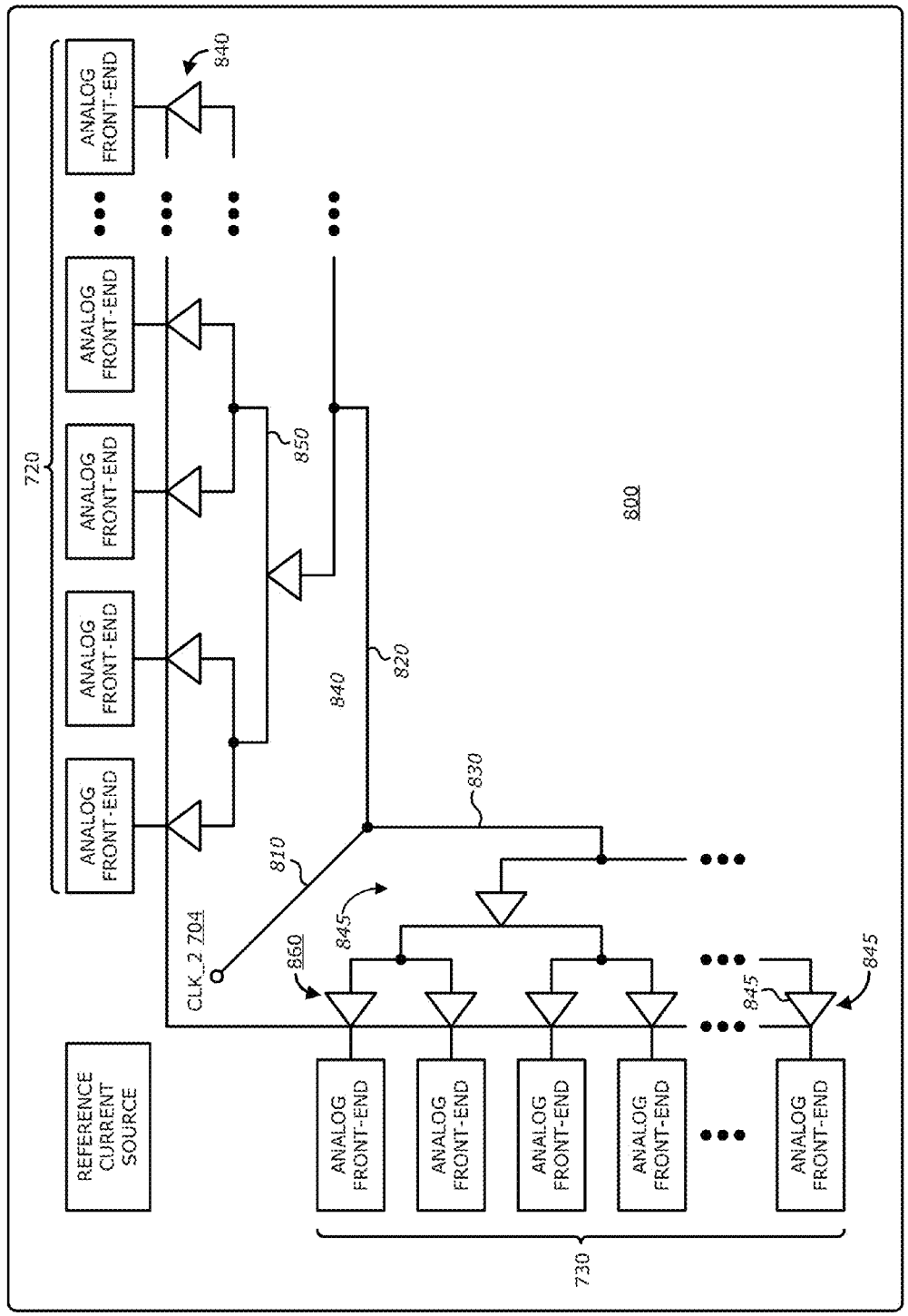
FIG. 8 is a clock distribution scheme for analog front-end systems forming part of the cross-correlator of FIG. 7.

Herein, as shown in FIG. 8, the interconnect scheme 800 is a tree-like distribution in which the CLK_2 signal 704 is provided to a common feed interconnect 810, which is coupled to a first primary feed interconnect 820 for the first plurality of AFEs 720 and a second primary feed interconnect 830 for the second plurality of AFEs 730. Drive circuits 840 and 845 are coupled to the primary feed interconnects 820 and 830 and secondary feed interconnects 850 and 855 associated with the AFEs 720 and 730 in efforts to maintain synchronicity between the supply clock signals (e.g., CLK_2 signal) to each of the first plurality of AFEs 720 and the second plurality of AFEs 730.

Referring back to FIG. 7, the clock generator 700 produces a third clock (CLK_3) signal 705 that is used by the summing and cross-correlating matrix 740 and a fourth clock signal (CLK_4) 706 that is used by the data serializer 750. It is contemplated that the CLK_3 signal 705 and the CLK_4 signal 706 may be generally set to the same frequencies as CLK_2 signal 704 or perhaps even different frequencies, provided that such frequencies are synchronous to each other.

The first plurality of AFEs 720 are adapted to receive RF components (e.g., I or Q components) generated by a first set of receivers (e.g., receivers 132 of FIG. 1) while the second plurality of AFEs 730 are adapted to receive RF components (e.g., I or Q components) generated by a different (second) set of receivers (e.g., receivers 133 of FIG. 1). According to one embodiment of the disclosure, the first set of receivers and the second set of receivers are located at different sources (e.g., arms 122 and 123 of the satellite 100). Herein, each of the AFEs 720/730 receives an incoming analog signal (e.g., I component or a Q component) and produces a pair of digital signals (binaries) that are provided to the summing and cross-correlating matrix 740, where the digitized outputs are cross-correlated and/or summed The cross-correlated data includes information that may be used for controlling brightness for image generation.

Referring to FIG. 9, an illustrative embodiment of an AFE from the first plurality of AFEs 720 or the second plurality of AFEs 730 is shown. Herein, AFE 721/731 (e.g., one of the first or second plurality of AFEs 720/730) features multi-stage (e.g. 3-stage), variable gain amplifier (VGA) 900, an analog-to-digital converter (ADC) 920, and an automatic gain controller (AGC) 940. According to one embodiment of the disclosure, the VGA 900 features a multi-stage VGA that receives an analog signal (e.g., I or Q component from a particular receiver) and produces differential outputs 910 and 912 that are provided to the ADC 920. A first differential output 910 is digitized by the ADC 920, which is clocked by a selected clock signal (e.g. CLK_2) 704, to produce digital outputs 930, 932 and 934 as described below. The AGC 940 is responsible for controlling both the gain and offset 960 for the VGA 900 based on feedback signaling 950 from the ADC 920. The offset is controlled in case of misalignment with a predetermined DC offset (e.g., zero or a prescribed offset).

Figure 10:
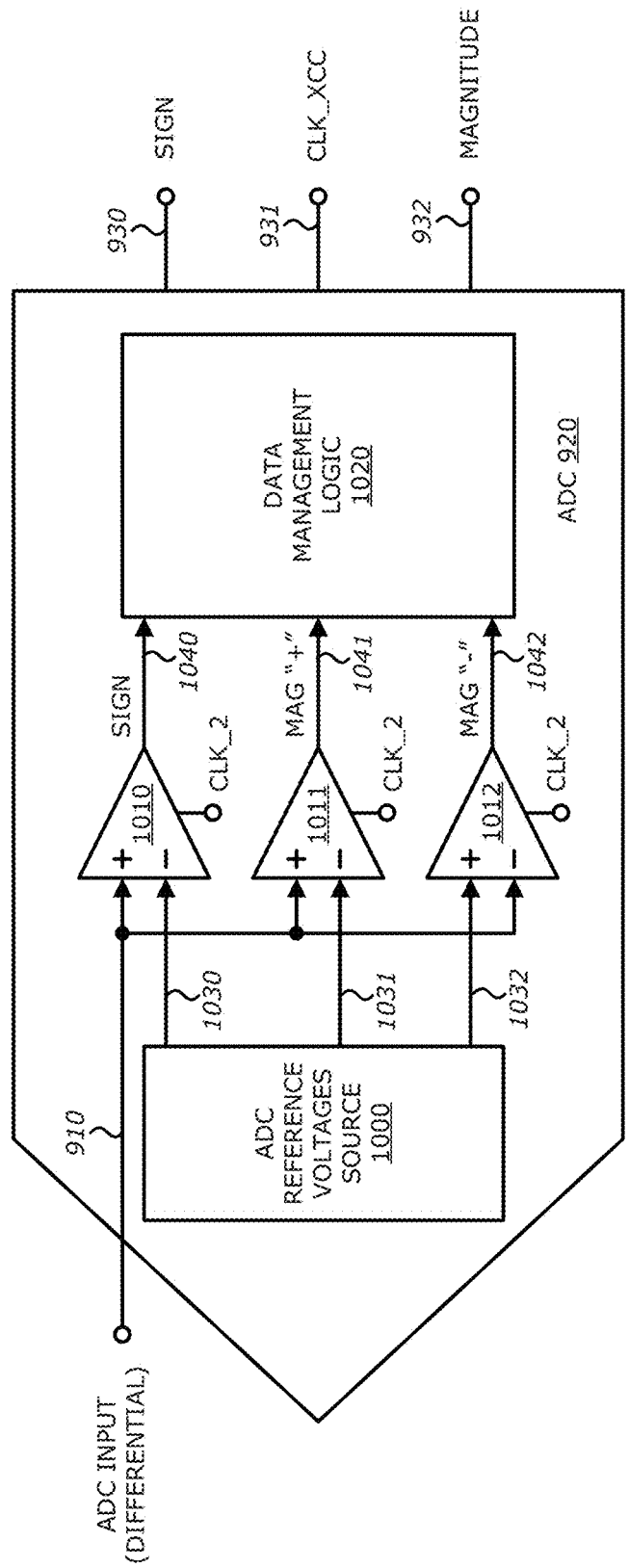
FIG. 10 is an illustrative embodiment of an analog-to-digital converter (ADC) is shown.

As shown in more detail in FIG. 10, an illustrative embodiment of the ADC 920 is shown. Herein, the ADC 920 features a reference voltage source 1000, a plurality of comparators 1010-1012 and data management logic 1020. As shown, the comparators 1010-1012 receive the first differential output 910 from the VGA 900 of FIG. 9 and generate at least two digital outputs 930, 932 and 934 used by the summing and cross-correlating matrix 740. More specifically, the reference voltage source 1000 is responsible for supplying a prescribed voltage 1030 operating as a reference voltage to a first input of each of the plurality of dynamic comparators 1010-1012 for comparison with a voltage associated with the first differential output 910. The first digital differential output 910 is based on the received analog RF components (e.g., I component or Q component) processed by the VGA 900 and is supplied to a second input of each of the plurality of comparators 1010-1012. The dynamic comparators 1010-1012 are clocked by the CLK_2 signal 704 (e.g., 1 GHz), and thus, are configured to provide digital samples at a certain edge transition of the CLK_2 signal.

As shown, the comparators 1010-1012 provide the digital samples 1040-1042 to the data management logic 1020, which buffers and synchronizes the digital samples as digital outputs 930, 932 and 934 from the ADC 920. The first digital output 930 is based on the digital sample 1040 produced by comparator 1010. A second digital output 932 is based on both the digital samples 1041-1042 from comparators 1011 and 1012, respectively. A third digital output 934 operates as a clock to synchronize XCCs within the summing and cross-correlating matrix 740 so that the cross-correlator cells (XCCs) perform summing action when the digital outputs are valid.

Figure 11:
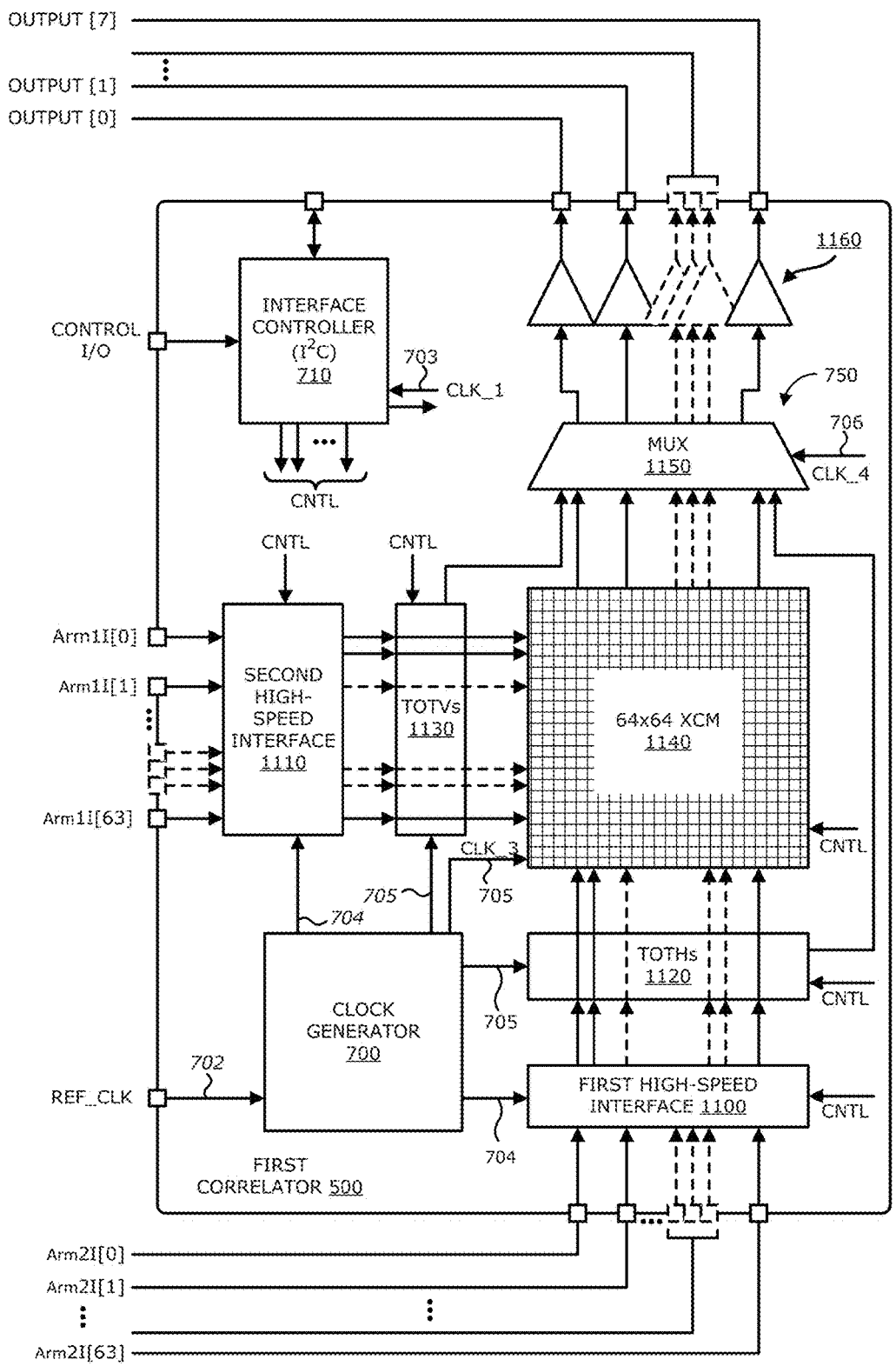
FIG. 11 is a second illustrative embodiment of the general architecture of the cross-correlator that is part of the cross-correlation system of FIG. 5.

Referring now to FIG. 11, a second illustrative embodiment of the architecture of the first cross-correlator 500 of FIG. 5, which is one of the plurality of cross-correlators 640 of FIG. 6, is shown. The first cross-correlator 500 comprises the clock generator 700; the (I²C slave) interface controller 710; a first high-speed interface 1100 that comprises the first plurality of AFEs 720 of FIG. 7; a second high-speed interface 1110 that comprises the second plurality of AFEs 730 of FIG. 7; a first plurality of summing logic 1120 (also referred to as the "horizontal totalizers" or "TOTHs") in communication with the first high-speed interface 1100; a second plurality of summing logic 1130 (also referred to as the "vertical totalizers") in communication with the second high-speed interface 1110; a cross-correlation matrix 1140 (e.g., 64×64 XCC matrix); the data serializer 750 operating, at least in part, as a multiplexer 1150 in communication with the first plurality of horizontal totalizers 1120, the second plurality of vertical totalizers 1130 and the cross-correlation matrix 1140; and a plurality of drivers 1160 in communication with the data serializer 750.

The clock generator 700 receives the REF_CLK signal 702 and distributes the secondary clock signals to the interface controller 710 (CLK_1 703), the first high-speed interface 1100 (e.g., CLK_2 signal 704), the second high-speed interface 1110 (e.g., CLK_2 signal 704), the horizontal totalizers 1120 (e.g., CLK_2 signal 704), the vertical totalizers 1130 (e.g., CLK_2 signal 704). Additionally, the clock generator 700 distributes CLK_3 signal 705 to the cross-correlation matrix 1140 and CLK_4 signal 706 to data serializer 750. These secondary clock signals (CLK_1-CLK_4) are synchronous with each other.

Figure 13:
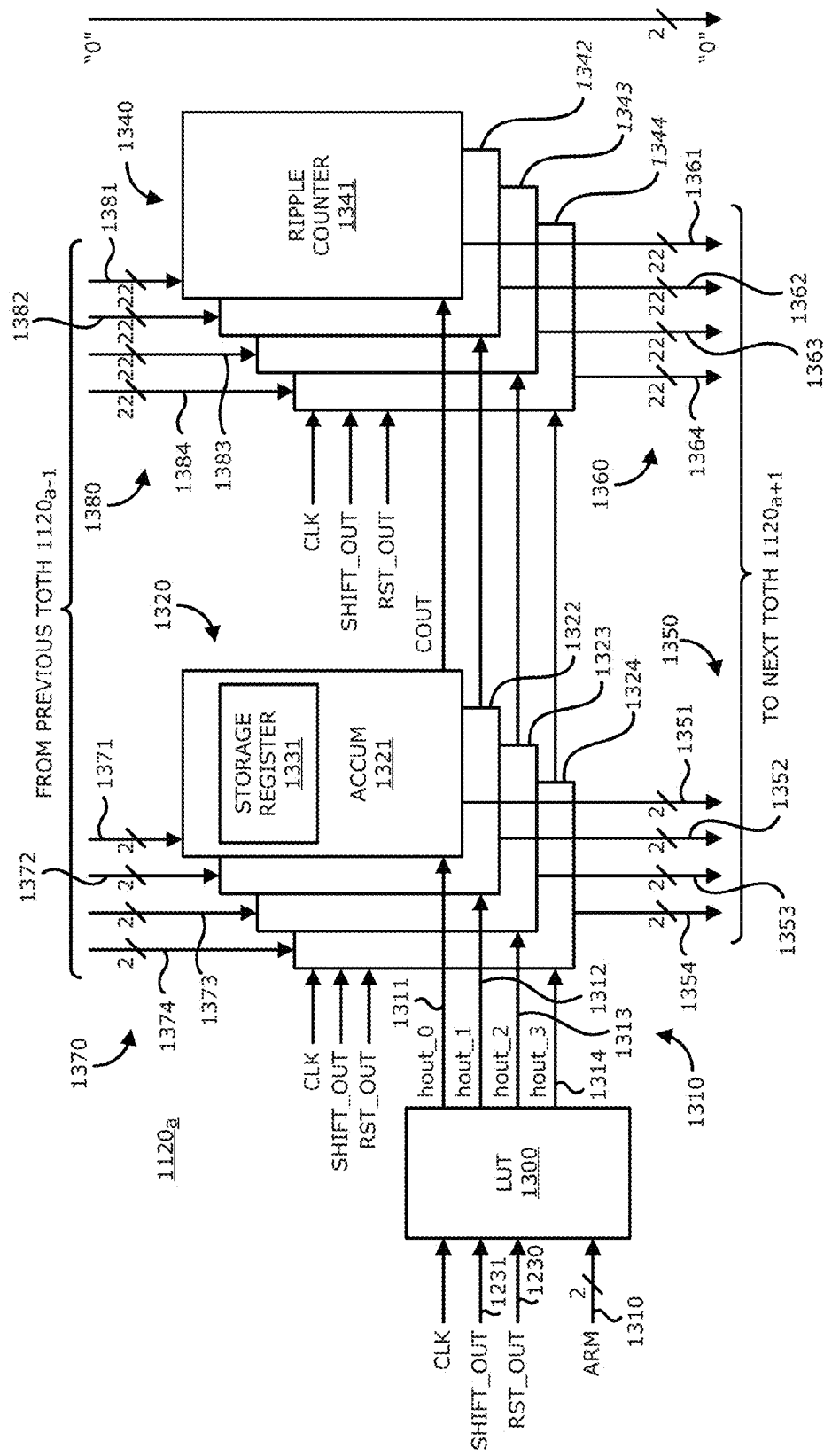
FIG. 13 is an illustrative embodiment of a horizontal totalizer forming part of the summing and cross-correlating matrix of FIG. 7.
Figure 14:
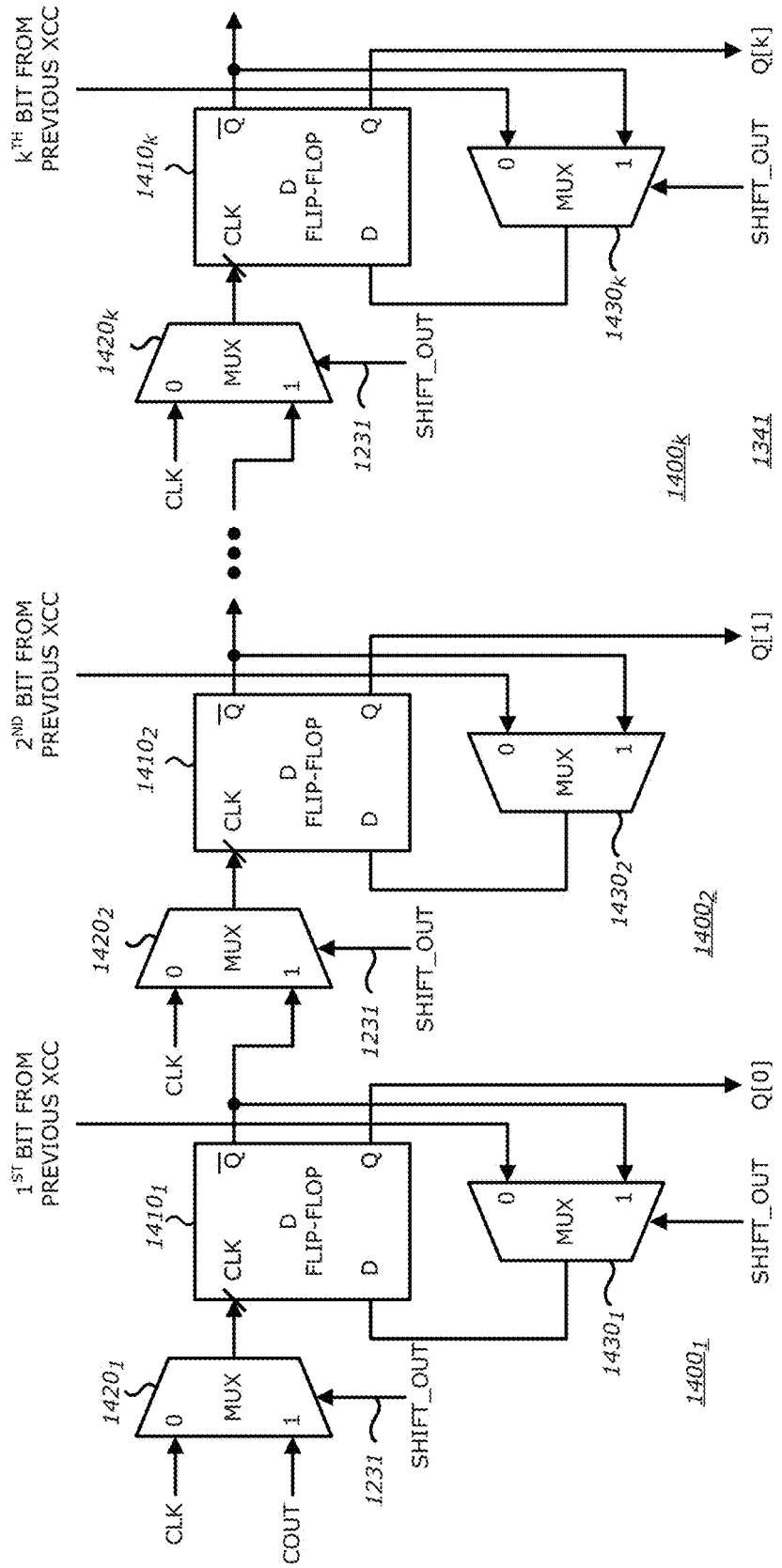
FIG. 14 is an illustrative embodiment of a ripple counter being part of each horizontal totalizer, vertical totalizer and cross-correlation cells forming the summing and cross-correlating matrix of FIG. 7.

The first high-speed interface 1100 is responsible for digitalizing the RF components (e.g., I or Q components) produced by one set of receivers (e.g., the first set of receivers associated with the first arm 122 of FIG. 1). More specifically, the first high-speed interface 1100 features the first plurality of AFEs 720, where each of the AFEs 720 receives an RF component (e.g., Arm2I[0] from a second receiver $133_0$ of the second arm 123) configured with an ADC to provide a two-bit digital output to a unique corresponding horizontal totalizer of the horizontal totalizers (TOTHs) 1120. Each horizontal totalizer is responsible for maintaining a count for each type of detected pairing of digital outputs as shown in FIGS. 13-14, where the count is used for rendering the image as described below. The operations of the first high-speed interface 1100 and the horizontal totalizers 1120 may be controlled, at least in part, by certain control (CNTL) signals from the interface controller 710, as shown in more detail in FIG. 12.

Figure 15:
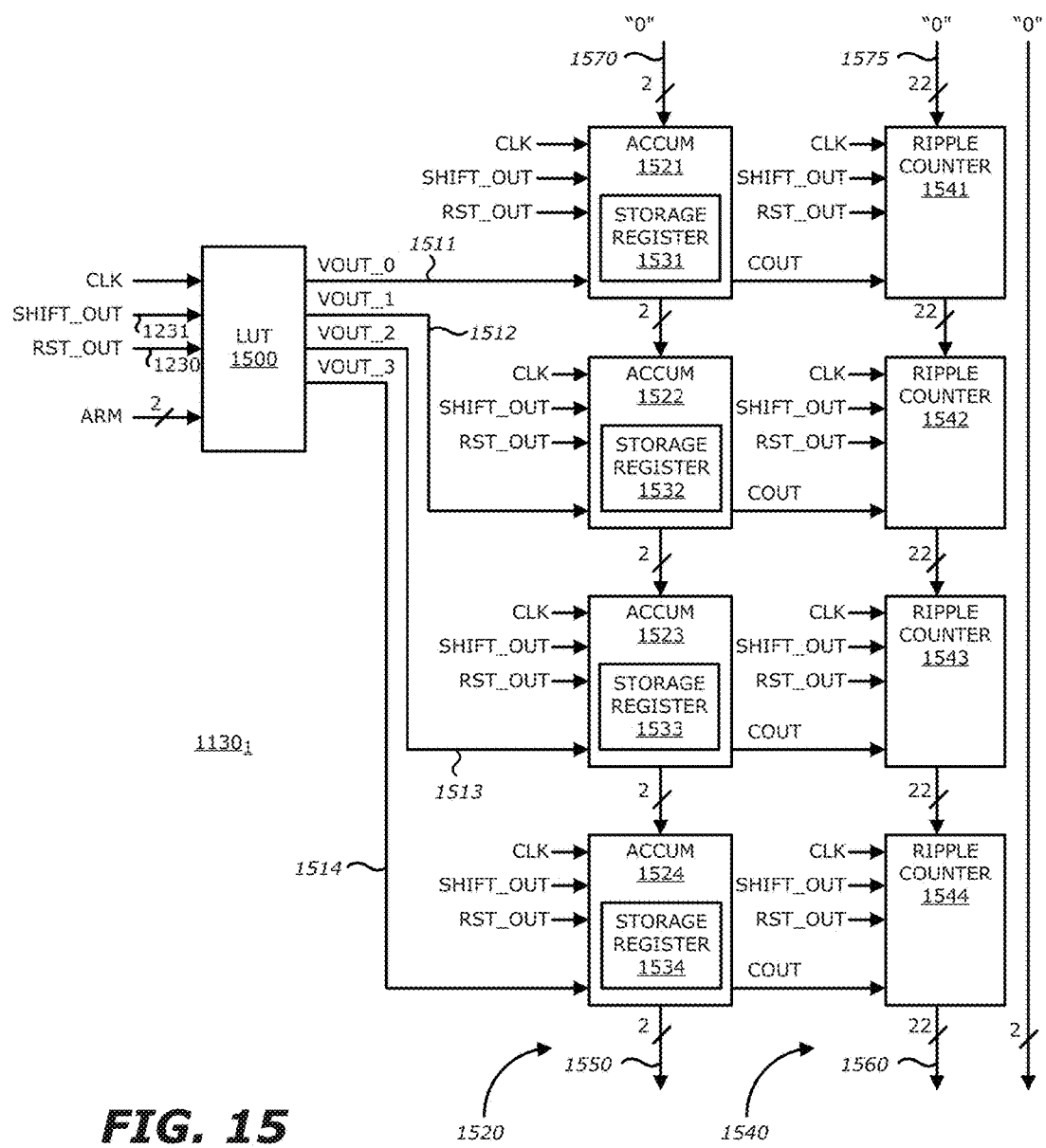
FIG. 15 is an illustrative embodiment of a vertical totalizer forming part of the summing and cross-correlating matrix of FIG. 7.

Similarly, the second high-speed interface 1110 is responsible for digitalizing the RF components (e.g., I or Q components) produced by another set of receivers (e.g., the second set of receivers associated with the second arm 123 of FIG. 1). More specifically, the second high-speed interface 1110 features the second plurality of AFEs 730, where each of the AFEs 730 uniquely corresponds to a vertical totalizer of the vertical totalizers (TOTVs) 1130 and is configured to receive an RF component (e.g., Arm1I[0] from a first receiver $132_0$ of the first arm 122) and produce a two-bit digital output to that corresponding vertical totalizer. Each vertical totalizer is responsible for maintaining a count of values associated with its corresponding digital outputs, where the count is used for rendering the image as described below. An illustrative example of a vertical totalizer 1130 is shown in FIGS. 14-15. The operations of the second high-speed interface 1110 and the vertical totalizers 1130 also may be controlled, at least in part, by certain control (CNTL) signals from the interface controller 710, as shown in more detail in FIG. 12.

Figure 16:
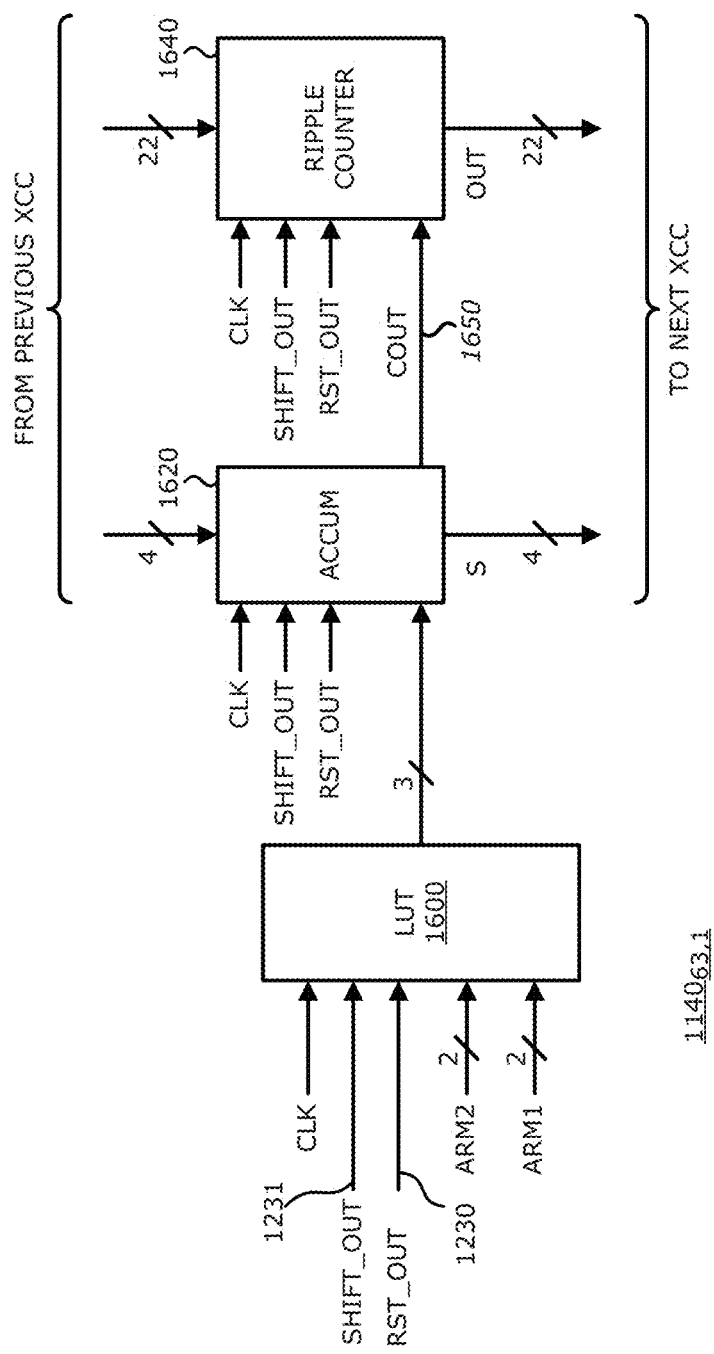
FIG. 16 is an illustrative embodiment of a cross-correlation cell forming part of the summing and cross-correlating matrix of FIG. 7.
Figure 17:
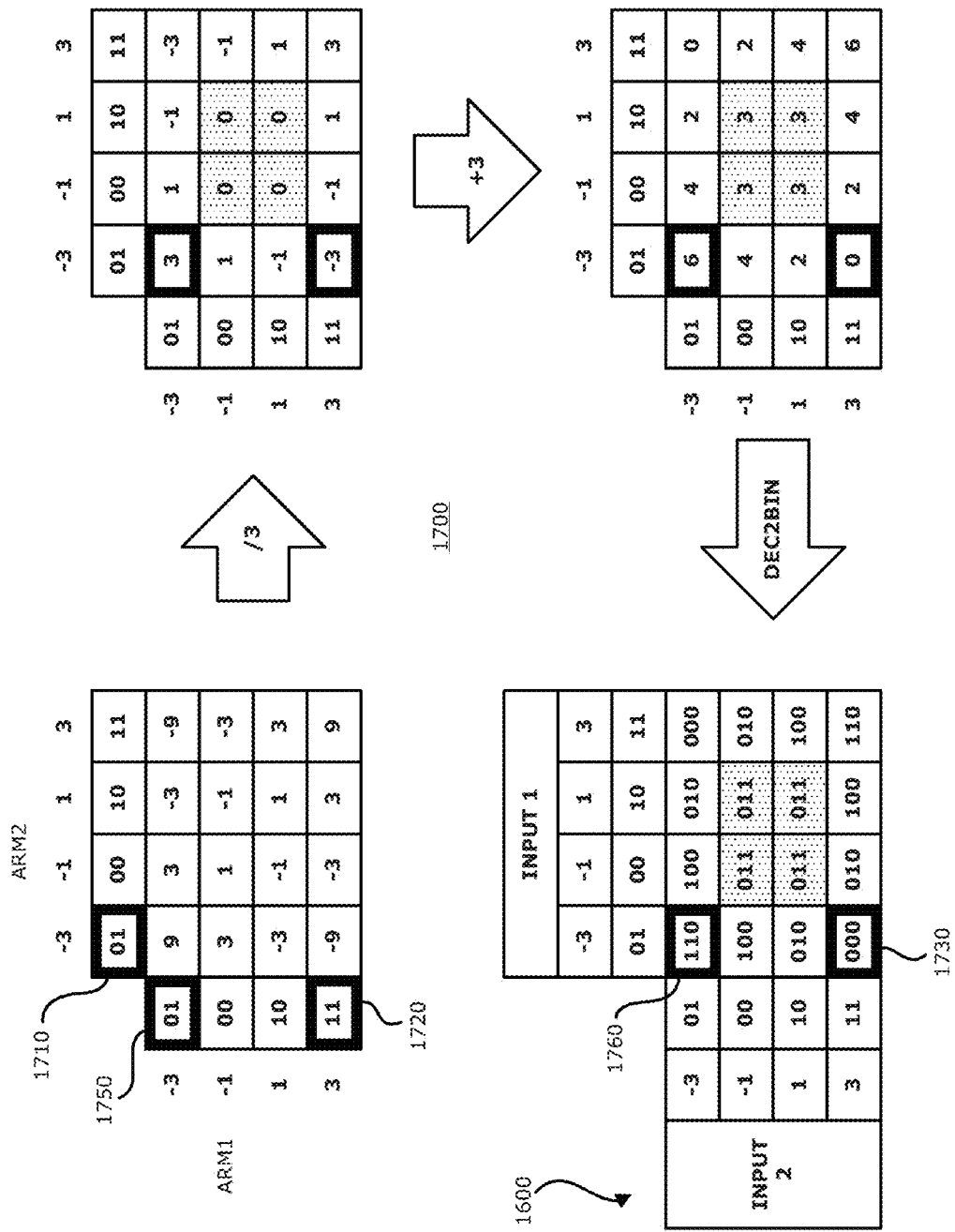
FIG. 17 is a look-up table utilized for the cross-correlation cell of FIG. 16.

The cross-correlation matrix 1140 for the first cross-correlator 500 is responsible for cross-correlating the digital outputs associated with different combinations of receivers from different sources. For instance, the cross-correlation matrix 1140 features a plurality of cross-correlation cells (XCCs), where each XCC uniquely performs a cross-correlation operation on digital outputs from different receivers associated with different sources. For instance, a first XCC may be adapted to receive digital outputs from a first receiver of a first arm (e.g., Arm1I[0]), which undergoes a cross-correlation analysis with digital outputs from a sixty-fourth receiver of a second arm (e.g., Arm2I[63]). The cross-correlation analysis includes an operation of assigning a resultant value that represents a degree of correlation between signaling from different receivers associated with different arms and stores the resultant values. For instance, as an illustrative example, where a first digital output of each of the Arm1I[0] and Arm2I [63] is active low ("0") and a second digital output of each of the Arm1I[0] and Arm2I[63] is active high ("1"), the resultant value (e.g., "110") may represent that there is a high degree of correlation between the digital outputs at this time. Similarly, where the digital outputs associated with Arm1I[0] is "00" and the digital outputs associated with Arm2I[63] is "11", the resultant value (e.g., "000") may represent that there is a low degree of correlation between the digital outputs at this time. An illustrative example of the first cross-correlation cell (XCC) is shown in FIGS. 16-17.

Figure 12:
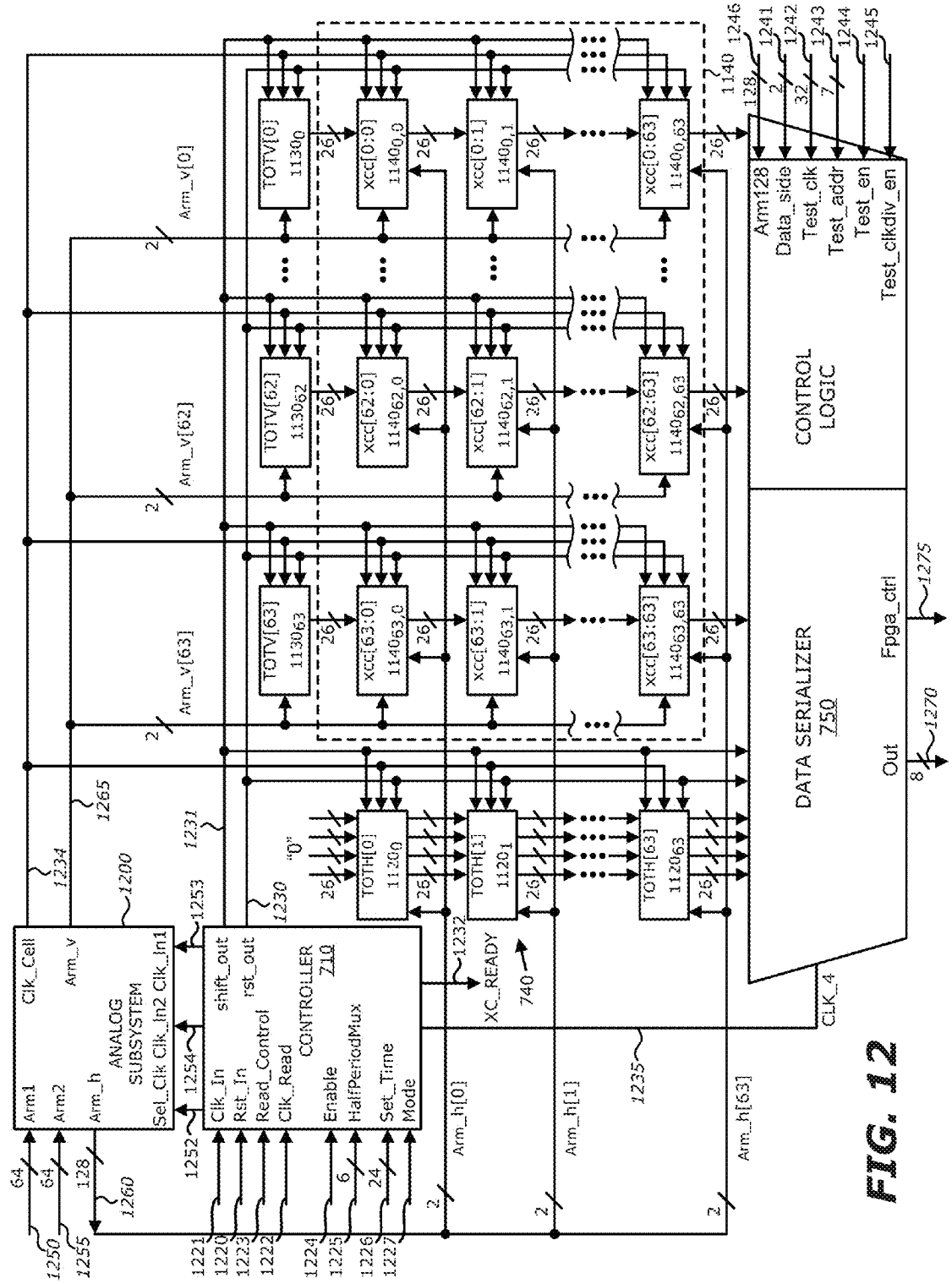
FIG. 12 is a more detail illustration of the architecture of the cross-correlator of FIG. 7 is shown.

Referring now to FIG. 12, a more detail illustration of the architecture of the first cross-correlator 500 of FIG. 5, which is one of the plurality of cross-correlators 640 of FIG. 6A, is shown. At any point in time, the first cross-correlator 500 is configured to operate in one of a plurality of modes, namely a first (Correlation) mode, a second (Read-Out) mode or a third (Test) mode. During Correlation mode, horizontal totalizers (TOTHs) 1120, the vertical totalizers (TOTVs) 1130 and cross-correlation cells (XCCs) of the cross-correlation matrix 1140 receive, process and store data from the receivers. However, when placed into Read-Out mode, the data serializer 750 of the cross-correlator 500 reads the stored data from the horizontal totalizers 1120, the vertical totalizers 1130 and the XCCs of the cross-correlation matrix 1140. At this time, the horizontal totalizers 1120, the vertical totalizers 1130 and the XCCs of the cross-correlation matrix 1140 do not process and store data from the receivers. In Test mode, operability of different logic within the first cross-correlator 500 may be monitored.

More specifically, the first cross-correlator 500 comprises the interface controller 710, an analog subsystem 1200 that includes the first and second plurality of AFEs 720 and 730 of FIG. 7 (not shown), the summing and cross-correlating matrix 740, and the data serializer 750. The summing and cross-correlating matrix 740 comprises (1) the horizontal totalizers 1120, which include a plurality of horizontal totalizers $1120_0$-$1120_N$ (where N≥7, N=63 for this illustrative example) that monitor digitalized output from a subset of receivers associated with a second arm (e.g., receivers $133_0$-$133_{63}$ of arm 123); (2) the vertical totalizers 1130, illustrated as a plurality of vertical totalizers $1130_0$-$1130_M$ (e.g., M≥7, M=63 for this illustrative example), which monitor digitalized output from a subset of receivers associated with a first arm (e.g., receivers $132_0$-$132_{63}$ of arm 122); and (3) the cross-correlation matrix 1140, which includes a plurality of cross-correlation cells (XCC) $1140_0$,o-$1140_{M,N}$, which perform cross-correlation of the digitized output (binary sign/magnitude values from the ADC) associated with RF signal received by multiple receivers at different sources (e.g., receivers $133_0$-$133_{63}$ of arm 123 and receivers $132_0$-$132_{63}$ of arm 122). For instance, XCC $1140_{62,1}$ performs a cross-correlation operation on digitalized outputs from arm 122 (e.g., Arm1I[62]) and arm 123 (e.g., ArmI2[1]).

Referring still to FIG. 12, the controller 710 comprises a plurality of inputs, including Rst_In 1220, Clk_In 1221, Clk_Read 1222, Read_Control 1223, Enable 1224, HalfPeriodMux 1225, Set_Time 1226 and Mode 1227.

Herein, the Rst_In 1220 is an input that, upon receipt of an active signal (e.g., logic "1"), causes the controller 710 to produce an active signal via Rst_Out output 1230 in order to reset certain components within the cross-correlator 500. As an illustrative example, in response to receipt of an active signal at Rst_In input 1220, the interface controller 710 resets the horizontal totalizers $1120_0\text{-}1120_N$ along with the vertical totalizers $1130_0\text{-}1130_M$, the cross-correlation cells (XCC) $1140_{0,0}\text{-}1140_{M,N}$, and the data serializer 750.

One or more clock signals may be supplied to controller 710. Herein, a first input clock signal (CLK_1) 703 is supplied to a Clk_In input 1221 and a second input clock signal (CLK_RD1) operating as a prescribed frequency (e.g., a 68 kilohertz "kHz" reference clock) may be supplied to a Clk_Read input 1222. As an illustrative embodiment, the CLK_1 signal has the same operating frequency as the REF_CLK signal (e.g., a 1 GHz clock) and is supplied to the controller 710 from an external source (e.g. clock generator 700 of FIG. 7). The CLK_RD1 signal has a substantially lower operating frequency than CLK_1 and may be supplied from another external source (e.g. the FPGA 632 of FIG. 6B) for use as a read readout. Although not shown herein, other clocking signals based on the REF_CLK signal (e.g., CLK_2 and CLK_3 which may be identical clock signals) are also supplied to each of the horizontal totalizers $1120_0\text{-}1120_{63}$ and the vertical totalizers $1130_0\text{-}1130_{63}$ as well as the XCCs $1140_{0,0}\text{-}1140_{63,63}$ via Clk_Cell output 1234 and its corresponding interconnect. The CLK_RD1 signal may be applied to data serializer 750 via interconnect 1235.

The Read_Control 1223 is an input that, upon receipt of an active signal (e.g., logic "1"), causes the controller 710, to select a read clock signal for use in data readout from the summing and cross-correlation matrix 740. The read clock signal may include the CLK_RD1 signal received by Clk_Read input 1222 or an internally generated read signal (hereafter "CLK_RD2" signal), which is provided via Clk_Cell output 1234 and via interconnect 1235. Upon selection of use of the internally generated read signal via the Read_Control input 1223, the clock speed of the CLK_RD2 signal is controlled by the HalfPeriodMux 1225.

The HalfPeriodMux 1225 is an input that sets a register within the controller 710 to adjust the clock speed of the CLK_RD2 signal, when the CLK_RD2 signal is provided to the data serializer 750 via interconnect 1235 and to the analog subsystem 1200 for distribution to horizontal totalizers $1120_0\text{-}1120_{63}$, the vertical totalizers $1130_0\text{-}1130_{63}$ and the XCCs $1140_{0,0}\text{-}1140_{63,63}$ via Clk_Cell output 1234. According to one embodiment of the disclosure, the input value (e.g., 6-bit value) sets the half-period of a CLK_RD2 signal in nanoseconds, which is supplied to and controls the read-out rate of the data serializer 750. Hence, multiple read-out cycles may be needed before completion of the shifting of stored data within the summing and cross-correlating matrix 740 into the data serializer 750. The shifting occurs to load data into the data serializer 750 starting at the first row of the summing and cross-correlating matrix 740 (e.g., horizontal totalizer $1120_{63}$ and XCC[63:63]-XCC[63:0]) up to a last row of the summing and cross-correlating matrix 740, namely the vertical totalizers $1130_0\text{-}1130_{63}$.

The Enable input 1224 is an input that is adapted to receive an Enable signal from the FPGA and/or controller (not shown), and in response, activate components associated with the summing and cross-correlating matrix 740, including the horizontal totalizers $1120_0\text{-}1120_{63}$, the vertical totalizers $1130_0\text{-}1130_{63}$, and the XCCs $1140_{0,0}\text{-}1140_{63,63}$. The Enable output and corresponding interconnects to the above-noted components are not shown to retain clarity respect with to other data and/or control paths as shown.

The Set_Time 1226 is an input configured to receive and supply an input value to an internal register within the controller 710 that sets the duration of the Correlation mode. According to one embodiment of the disclosure, the input value (e.g., 24-bit value) sets the duration in nanoseconds as to how long the cross-correlator 500 operates in Correlation mode before placement into Read-Out mode if an XC_Ready output 1232 is set. The XC_Ready output 1232 is an output that indicates the correlation process is complete and the data is ready to be read out. The output (Out) 1270 is provided to the FPGA 632 and/or board controller 634 and the control signal (Fpga_Ctrl) 1275 is sent to the FPGA 632 to cause the FPGA 632 to prepare for receipt of data.

The Mode 1227 is an input that sets the cross-correlator 500 into at least either Read-Out mode or Correlation mode. During Read-Out mode, for each read cycle, data within the horizontal totalizers $1120_0\text{-}1120_{63}$, the vertical totalizers $1130_0\text{-}1130_{63}$, the XCCs $1140_{0,0}\text{-}1140_{63,63}$ is shifted downward toward the data serializer 750 under control of Shift_Out outputs 1231 from the controller 710. As data is received from horizontal totalizer $1120_{63}$ and XCCs $1140_{63,0}\text{-}1140_{63,63}$, the data serializer 750 continuously outputs a prescribed amount of data (e.g., one byte) to FPGA 632 of FIG. 6B for storage and subsequent re-transmission from the satellite. During Correlation mode, the plurality of horizontal totalizers $1120_0\text{-}1120_{63}$, the plurality of vertical totalizers $1130_0\text{-}1130_{63}$, and the plurality of XCCs $1140_{0,0}\text{-}1140_{63,63}$ are configured to receive data, process and store data received from the receivers and processed by analog subsystem 1200.

The analog subsystem 1200 receives clocking signals from the controller 710. Internal logic within the analog system (e.g., AFEs) utilizes the CLK_2 signal (e.g., 1 GHz). However, through Sel_Clk input 1252, the controller 710 selects whether the analog subsystem 1200 outputs either (i) the CLK_1 signal provided via Clk_In1 1253 or (ii) a read clock signal provided via Clk_In2 1254, namely CLK_RD1 or CLK_RD2, to logic forming the summing and correlating matrix 740 via the Clk_Cell output 1234.

More specifically, when the cross-correlator 500 is operating in the Correlation mode, where data is being processed and stored in the horizontal totalizers $1120_0\text{-}1120_{63}$, the vertical totalizers $1130_0\text{-}1130_{63}$, and the plurality of XCCs $1140_{0,0}\text{-}1140_{63,63}$, the controller 710 provides signaling to Sel_Clk input 1252 to supply CLK_2 signal from Clk_Cell 1234. Alternatively, when the cross-correlator 500 is operating in the Read-Out mode or Test mode, the controller 710 provides signaling to Sel_Clk input 1252 to supply CLK_RD1 or CLK_RD2 signal from Clk_Cell 1234. As described above, in Read-Out mode, data stored in the horizontal totalizers $1120_0\text{-}1120_{63}$, the vertical totalizers $1130_0\text{-}1130_{63}$, and the plurality of XCCs $1140_{0,0}\text{-}1140_{63,63}$ are read out by the data serializer 750. In Test mode, testing may be conducted on operability of certain totalizers or XCCs as described below. The change in clock speed is due, in large part, for power-savings.

The analog subsystem 1200 receives the RF components (e.g., Arm1I[63:0]) from the receivers $132_0\text{-}132_{63}$ associated with the arm 122 of FIG. 1 via Arm1 inputs 1250 and RF components (e.g., Arm2Q[63:0]) from the receivers $133_0\text{-}133_{63}$ associated with the arm 123 of FIG. 1 via Arm2 inputs 1255. Of course, in lieu of receiving RF components from the receivers $132_0\text{-}132_{63}$ or $132_{64}\text{-}132_{127}$ via Arm1 inputs 1250 and from the receivers $133_0\text{-}133_{63}$ or $133_{64}\text{-}133_{127}$ via Arm2 inputs 1255, it is contemplated that RF components from different combination of outputs from receivers may be provided to Arm1 inputs 1250 and Arm2 inputs 1255. For instance, it is contemplated that (1) RF components from receiver $134_0\text{-}134_{63}$ or receivers $134_{64}\text{-}134_{127}$ may be received via Arm1 inputs 1250 and RF components from the receivers 133$_0$-133$_{63}$ or receivers 133$_{64}$-133$_{127}$ may be received via Arm2 inputs 1255; (3) RF components from receivers 134$_0$-134$_{63}$ or receivers 134$_{64}$-134$_{127}$ may be received via Arm1 inputs 1250 and RF components from the receivers 132$_0$-132$_{63}$ or receivers 132$_{64}$-132$_{127}$ may be received via Arm2 inputs 1255; or (3) RF components from the receivers 132$_0$-132$_{63}$ or receivers 132$_{64}$-132$_{127}$ may be received via Arm1 inputs 1250 and RF components from receivers 134$_0$-134$_{63}$ or receivers 134$_{64}$-134$_{127}$ may be received via Arm2 inputs 1255.

As shown, for illustrative purposes, the AFEs associated with each RF component input produces two digital (binary) outputs, which are supplied to corresponding horizontal totalizers via Arm_h output 1260 and both corresponding vertical totalizers and columns of XCC cells via Arm_v output 1265. For instance, the digital outputs 1260 associated with Arm_h[i] (e.g., 0≤i≤63, namely Arm2I[i]) is supplied to the i$^{th}$ horizontal totalizer (TOTH[i]) along with a i$^{th}$ row of XCC cells associated with the cross-correlation matrix 1140, namely XCC[63:i], XCC[62:i], . . . , and XCC[0:i]. Similarly, in accordance with the illustrative example, the digital outputs associated with Arm_v[j] (e.g., 0≤j≤63, namely Arm1I[j]) is supplied to a j$^{th}$ vertical totalizer (TOTV[j]) along with a j$^{th}$ column of XCC cells associated with the cross-correlation matrix 1140, namely XCC[j:0], XCC[j:1], . . . , and XCC[j:63]. The clock signaling from the Clk_Cell output 1234 is provided to and synchronizes the horizontal totalizers 1120$_0$-1120$_{63}$, the vertical totalizers 1130$_0$-1130$_{63}$ and the XCCs 1140$_{0,0}$-1140$_{63,63}$.

Lastly, the data serializer 750 operates, at least in part, as a multiplexer that receives a first collection of bits as input, applies padding (as needed), and produces an output that is lesser in size than the input. For instance, the data serializer 750 receives 1768 bits as input (e.g., 26 bits*68 parallel input streams), applies padding to each of the 26 bits to produce 32-bit results, and outputs multi-bit results 1270 (e.g., 8-bit results) in series from the data serializer 750. It is contemplated that any output bit sizes may be used without departing from the spirit of the invention. The multi-bit results 1270 may be transmitted to a remote destination and, through use of Fourier-transform operation(s), is used to generate a brightness image of weather and/or climate conditions (e.g., temperature and/or the water vapor content in the atmosphere) that are representative by the results 1270.

Besides operating as a multiplexer, the data serializer 750 comprises control logic that enables the cross-correlator to operate in Test mode. For entering into Test mode and controlling such functionality, the control logic features a plurality of inputs for testing. These inputs include Data_side 1241; Test_clk 1242; Test_addr 1243; Test_en 1244; Test_clkdiv_en 1245; and Arm128 1246.

Arm128 1246 is an input that is adapted to receive and pass test data to the data serializer 750 when a test enable (Test_en) signal 1244 is set so as to enable the Test mode of the data serializer 750. This provides an ability to read out ADC binary data directly without processing to ensure that the ADCs are working properly in digitizing the RF components.

The Data_side 1241 is an input that enables data to be manually fed into the Arm128 input 1246 in lieu of data received from one or more ADC outputs.

The Test_clk 1242 is an input that is adapted to receive a clock signal (CLK_XCC of FIG. 9) from a particular ADC. As four (4) cross-correlators are included as part of the same cross-correlation system (e.g., cross-correlation system 345) and their clocking is synchronized, only 32 inputs are provided as opposed to the 128 cross-correlators. The third output 934 for an ADC of a particular cross-correlator within each cross-correction system 340-395 is coupled to the Test_clk 1242.

The Test_addr 1243 is an input that is adapted to receive a test-address of one of the ADCs, which allows for a selection of which of the 128 ADCs is to be read.

The Test_clkdiv_en 1245 is an input that is adapted for use in slowing the Read clock signal selected for reading out the ADCs data.

With respect to FIG. 13, an illustrative embodiment of a horizontal totalizer (e.g., horizontal totalizer 1120$_a$, where a≥0) is shown. Herein, the horizontal totalizer 1120$_a$ comprises a look-up table (LUT) 1300 that is coupled to a plurality of accumulators (Accum) 1320, which are oriented in parallel and each coupled to a corresponding ripple counter of the plurality of ripple counters 1340.

Herein, when the cross-correlator 500 is operating in Correlation mode, namely the Shift output (Shift_Out) 1231 of the controller 710 is set to a first state (e.g., logic HIGH or "1") and a Reset output (Rst_Out) 1230 of the controller 710 is set to a second state (e.g., logic LOW or "0"), the look-up table 1300 operates as a 2:4 decoder. In particular, the look-up table 1300 receives two digital outputs 1310 from a corresponding ADC and, based on the values associated with the digital outputs 1310 and at the end of each clock cycle of the selected clocking signal (e.g. CLK_2), produces an output that corresponds to the sum value of the two digital outputs 1310. As an illustrative example, one of its outputs (hout_0, hout_1, hout_2 & hout_3) 1311-1314 from the look-up table 1300 is activated to represent the digital value. For instance, where a first digital (sign) output is a "1" and a second digital (magnitude) output is a "0", the hout_2 1313 is activated (e.g., logic "1") to represent and count value of "2". Similarly, where a first digital (sign) output is a "0" and a second digital (magnitude) output is a "1", hout_1 1312 is activated (e.g., logic "1") to represent and count value of "1".

The activation of an output signal is provided to a corresponding accumulator 1321-1324 (e.g., accumulator 1321) that increases a count value maintained by its corresponding internal storage register 1331-1334 (e.g., storage register 1331). Once an overflow condition occurs in which the count value now exceeds a storage capacity of the storage register 1331, accumulator 1321 generates a carry output (Cout) to a corresponding ripple counter 1341 and the accumulator 1331 maintains the count value prior to the overflow condition (e.g., "3" where the storage register 1331 is a 2-bit register). The ripple counters 1341-1344 provide a greater amount of storage than provided by the accumulators 1321-1324.

When the cross-correlator 500 is operating in Read-Out mode, namely the Shift output (Shift_Out) 1230 is set to the second state (e.g., logic Low or "0") and a Reset output (Rst_Out) 1230 of the controller 710 remains in the second state (e.g., logic LOW or "0"), the accumulators 1320 and ripple counters 1340 output their stored count values via interconnects 1350 and 1360, respectively. More specifically, storage register 1331-1334 provide their stored values via interconnects 1351-1354 to corresponding accumulators associated with an adjacent horizontal totalizer (e.g., horizontal totalizer "TOTH" 1120$_{a+1}$). Ripple counters 1341-1344 provide their stored values via interconnects 1361-1364 to corresponding ripple counters associated with the adjacent horizontal totalizer. However, for horizontal totalizer $1120_{63}$, the stored values from storage register 1331-1334 along with the stored values from the ripple counter 1341-1344 are provided to the data serializer 750 for padding and subsequent read out.

Additionally, the accumulators 1320 and ripple counters 1340 receive as input stored count values via interconnects 1370 and 1380, respectively. More specifically, for horizontal totalizer $1120_0$ (a=0), the storage register 1331-1334 and D flip-flops of the ripple counters 1341-1344 are driven low by logic "0" inputs via interconnects 1371-1374 and 1381-1384, respectively. However, for other horizontal totalizers $1120_a$ (e.g., horizontal totalizers $1120_1$-$1120_{63}$, $1 \leq a \leq 63$), the storage register 1331-1334 receive stored values via interconnects 1371-1371 from corresponding accumulators of an adjacent horizontal totalizer (TOTH) $1120_{a-1}$ (e.g., horizontal totalizer $1120_0$ ... or $1120_{62}$). Similarly, ripple counters 1341-1344 receive stored values via interconnects 1381-1384 from corresponding ripple counters associated with the adjacent horizontal totalizer $1120_{a-1}$.

As shown in FIG. 14, in general, a counter is a device which stores the number of times a particular event has occurred, often in relationship to an input clock signal. Each ripple counter (e.g., ripple counter 1341) is an asynchronous counter that comprises a plurality of stages $1400_1$-$1400_k$ (K>1), where each stage $1400_1$ ..., or $1400_k$ comprises a flip-flop $1410_1$ ..., or $1410_k$ (e.g., D flip-flops) along with a first multiplexer $1420_1$ ..., or $1420_k$ having an output coupled to a clock (CLK) input of the flip-flop $1410_1$ ..., or $1410_k$ and a second multiplexer $1430_1$ ..., or $1430_k$ having an output coupled to a data input (D) input of the flip-flop $1410_1$ ..., or $1410_k$. As shown, the first multiplexer $1420_1$ associated with the first stage $1400_1$ receives as input a read clock signal (e.g., CLK_RD1 or CLK_RD2 signal) and a Carry Out (Cout) signal by its corresponding accumulator 1321 while the first multiplexer $1420_2$ for the subsequent stages $1400_2$-$1400_k$ receive as input the read clock signal and an inverted output of the preceding flip-flop $1410_1$ ..., or $1410_{k-1}$. A second multiplexer $1430_1$-$1430_k$ receives as input (i) a bit associated with a corresponding flip-flop from a ripple counter within another totalizer or XCC, and (ii) the inverted output of the flip-flop $1410_1$ ..., or $1410_k$.

Herein, when the cross-correlator 500 is operating in Correlation mode, namely the Shift output (Shift_Out) 1231 of the controller 710 is set to a first state (e.g., logic HIGH or "1"), a first flip-flop $1410_1$ of the ripple counter 1341 is clocked by the Carry Out (Cout) signal by its corresponding accumulator 1321 and the subsequent flip-flops $1410_2$-$1410_k$ are clocked by the inverted output (Qinv) output of its preceding flip-flop $1410_1$-$1410_{k-1}$. Hence, the flip-flops $1410_1$-$1410_k$ are coupled in series and, in combination with feedback from the inverted output, act to as binary counter in order to count the number of Carry Outs from the accumulator 1321 up to "k".

When the cross-correlator 500 is operating in Read-Out mode, namely the Shift output (Shift_Out) 1231 of the controller 710 is set to the second state (e.g., logic LOW or "0"), each flip-flop $1410_1$, ..., or $1410_k$ of the ripple counter 1341 is clocked by the read clock signal (e.g., CLK_RD1 or CLK_RD2), and thus, the flip-flops $1410_1$-$1410_k$ are not coupled in series. Instead, the flip-flops $1410_1$-$1410_k$ are isolated from each other and operate independently. As shown, the second multiplexer $1410_1$-$1410_k$ receives as input a bit associated with a corresponding flip-flop from a ripple counter within another totalizer or XCC, which is provided into the inputs of the flip-flops $1410_1$-$1410_k$ while the outputs (Q[0]-Q[K]) of each flip-flops $1410_1$-$1410_k$ is provided to a corresponding flip-flop of a ripple counter associated with a neighboring totalizer or XCC in the summing and correlating matrix or to the data serializer when the totalizer or XCC is immediately adjacent to the data serializer 750.

With respect to FIG. 15, an illustrative embodiment of a vertical totalizer (e.g., vertical totalizer $1130_1$) is shown. Herein, the vertical totalizer $1120_1$ comprises a look-up table 1500 that is coupled to a plurality of accumulators (Accum) 1520, which are oriented in series and each coupled to a corresponding ripple counter of the plurality of ripple counters 1540.

Herein, when the cross-correlator 500 is operating in Correlation mode, namely the Shift output (Shift_Out) 1231 of the controller 710 is set to the first state (e.g., logic HIGH or "1") and a Reset output (Rst_Out) 1230 of the controller 710 is set to the second state (e.g., logic LOW or "0"), the look-up table 1500 operates as a 2:4 decoder. In particular, the look-up table 1500 receives two digital outputs 1510 from a corresponding ADC and, based on the values associated with the digital outputs 1510 and at the end of each clock cycle (e.g., CLK is equivalent to CLK_2), produces an output that corresponds to the sum value of the two digital outputs 1510. As an illustrative example, one of its outputs (vout_0, vout_1, vout_2 & vout_3) 1511-1514 from the look-up table 1500 is activated to represent the digital value. As described above, where a first digital (sign) output is a "1" and a second digital (magnitude) output is a "0", the vout_2 1513 is activated (e.g., logic "1") to represent and count value of "2". Similarly, where a first digital (sign) output is a "0" and a second digital (magnitude) output is a "1", vout_1 1512 is activated (e.g., logic "1") to represent and count value of "1".

The activation of an output signal is provided to a corresponding accumulator 1521-1524 (e.g., accumulator 1521) that increases a count value maintained by its corresponding internal storage register 1531-1534 (e.g., storage register 1531). Once an overflow condition occurs in which the count value now exceeds a storage capacity of the storage register 1531, accumulator 1521 generates a carry output (Cout) to a corresponding ripple counter 1541 and the accumulator 1531 maintains the count value prior to the overflow condition (e.g., "3" where the storage register 1531 is a 2-bit register). The ripple counters 1541-1544 provide a greater amount of storage than provided by the accumulators 1521-1524.

When the cross-correlator 500 is operating in Read-Out mode, namely the Shift output (Shift_Out) 1230 is set to the second state (e.g., logic Low or "0"), both the accumulators 1521-1524 and ripple counters 1541-1544 associated with the vertical totalizer $1130_1$ successively output their stored count values serially, in some cases through other accumulators or ripple counters in the same vertical totalizer (e.g., vertical totalizer $1130_1$), until the values are output via interconnects 1550 and 1560, respectively. Hence, both the storage registers 1531-1534 and the ripple counters 1541-1544 cascade their stored values serially until output to a corresponding XCC (e.g., XCC[1:0] for vertical correlator $1130_1$). Furthermore, based on this serial coupling, the accumulators 1521-1524 and ripple counters 1541-1544 are effectively reset as reset inputs "0" 1570 and 1575 are read into accumulator 1521 and ripple counter 1541 at the start of the Read-Out mode and these values cascade through the serially-coupled accumulators 1522-1524 and ripple counters 1542-1544 in subsequent read clock (e.g., CLK_RD1 or CLK_RD2) cycles.

Referring now to FIG. 16, an illustrative embodiment of an architecture of a cross-correlation cell, such as XCC $1140_{63,1}$ of FIG. 12, is shown. Herein, XCC $1140_{63,1}$ comprises a look-up table 1600, an accumulator 1620 and a ripple counter 1640. The accumulator 1620 and the ripple counter 1640 operate in a manner similar to the accumulators and ripple counters described above. However, the look-up table 1600 operates in a different manner.

Herein, when the cross-correlator 500 is operating in Correlation mode in which the Shift output (Shift_Out) 1231 is set to a first state (e.g., logic HIGH or "1"), the look-up table (LUT) 1600 operates to produce an output that provides a value representative of the correlation between the I component (e.g., ArmI[63]) from the first arm and the I component (e.g., ArmI[1]) from a second arm.

As shown in FIG. 17, the look-up table 1600 includes combinatorial logic that generally operates as a multiplier to produce an output where a lower correlation value representing less correlation between the two inputs. For instance, as shown in the operational flow 1700 of the look-up table, where the digital outputs associated with an RF component from an $i^{th}$ receiver associated with the second arm (e.g., Arm2[i] 1710) is represented by "01" (sign=0; mag=1) and the digital outputs associated with an RF component from an $j^{th}$ receiver associated with the first arm (e.g., Armi[j] 1720) is represented by "11" (sign=1; mag=1), the look-up table provides an output "000" 1730 which denotes wide diversity between the two outputs. Conversely, where Arm2[i+1] 1710 is represented by "01" (sign=0; mag=1) and Arm1[j+1] 1750 is represented by "01" (sign=0; mag=1), the look-up table 1600 provides an output "110" 1760 which denotes the highest correlation between two digitalized RF components.

Referring back to FIG. 16, the output is provided to the accumulator 1620 that maintains the value until one of three conditions occurs. First, the accumulator 1620 reaches a threshold count value, which causes the stored value within the accumulator to be passed to the ripple counter 1640 via output (Cout) 1650. Second, the accumulator 1620 receives an inactive Shift signal, which causes the value of the accumulator 1620 and its corresponding ripple counter 1640 to be shifted to a neighboring XCC or the data serializer. Lastly, the accumulator receives a Reset output (Rst_Out) signal 1230, normally in response to an external reset condition, which resets the values set forth in the accumulator 1620 and its corresponding ripple counter 1640.

Figure 18:
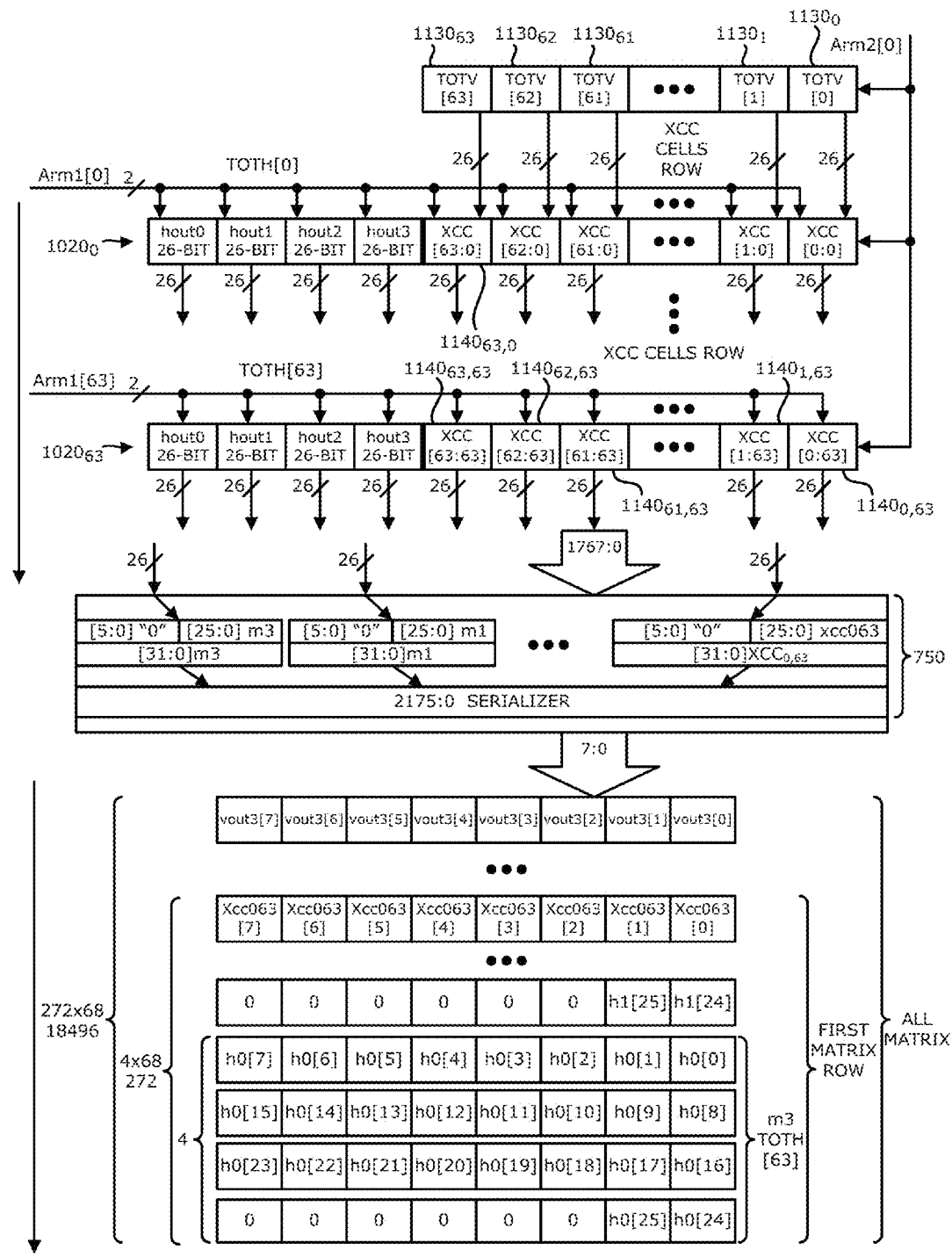
FIG. 18 is an exemplary embodiment of a data flow in accordance with the illustrative embodiment of the cross-correlator of FIG. 7.

Referring now to FIG. 18, an exemplary embodiment of a data flow in accordance with the illustrative embodiment of the cross-correlator 500 is shown. Herein, upon placing the cross-correlator 500 into the Read_Out mode, during a first read cycle, the data serializer 750 receives stored data associated with a first row of the summing and correlating matrix which, according to this embodiment of the disclosure, includes four (4) 26-bit inputs (e.g., 2-bit stored accumulator value, 22-bit ripple count value, 2-bits "0" pad) from horizontal totalizer $1120_{63}$ (represented as "h0[25-0]," "h1[25-0]", etc.) and (64) 26-bit inputs (e.g., 4-bit stored accumulator value, 22-bit ripple count value) from XCCs $1140_{63,63}$-$1140_{0,63}$. Bit padding may be subsequently applied prior to generating appropriately bit-size, correlated data associated with measured RF signals.

Additionally, 26-bit inputs (e.g., 2-bit stored accumulator value, 22-bit ripple count value, 2-bits "0" pad) are received by XCCs $1140_{0,0}$-$1140_{63,0}$ from the vertical totalizers $1130_{0}$-$1130_{63}$. Also, 26-bit inputs (e.g., 4-bit stored accumulator value, 22-bit ripple count value) are received by XCCs $1140_{0,R+1}$-$1140_{63,R+1}$ ($0 \leq R \leq 62$) from XCCs $1140_{0,R}$-$1140_{63,R}$. Lastly, four 26-bit inputs associated with the four accumulator/ripple counter pairs within each horizontal totalizer $1120_{0}$-$1120_{62}$ transitions into corresponding accumulator/ripple counter pairs of a neighboring horizontal totalizer $1120_{1}$-$1120_{63}$.

Figure 19:
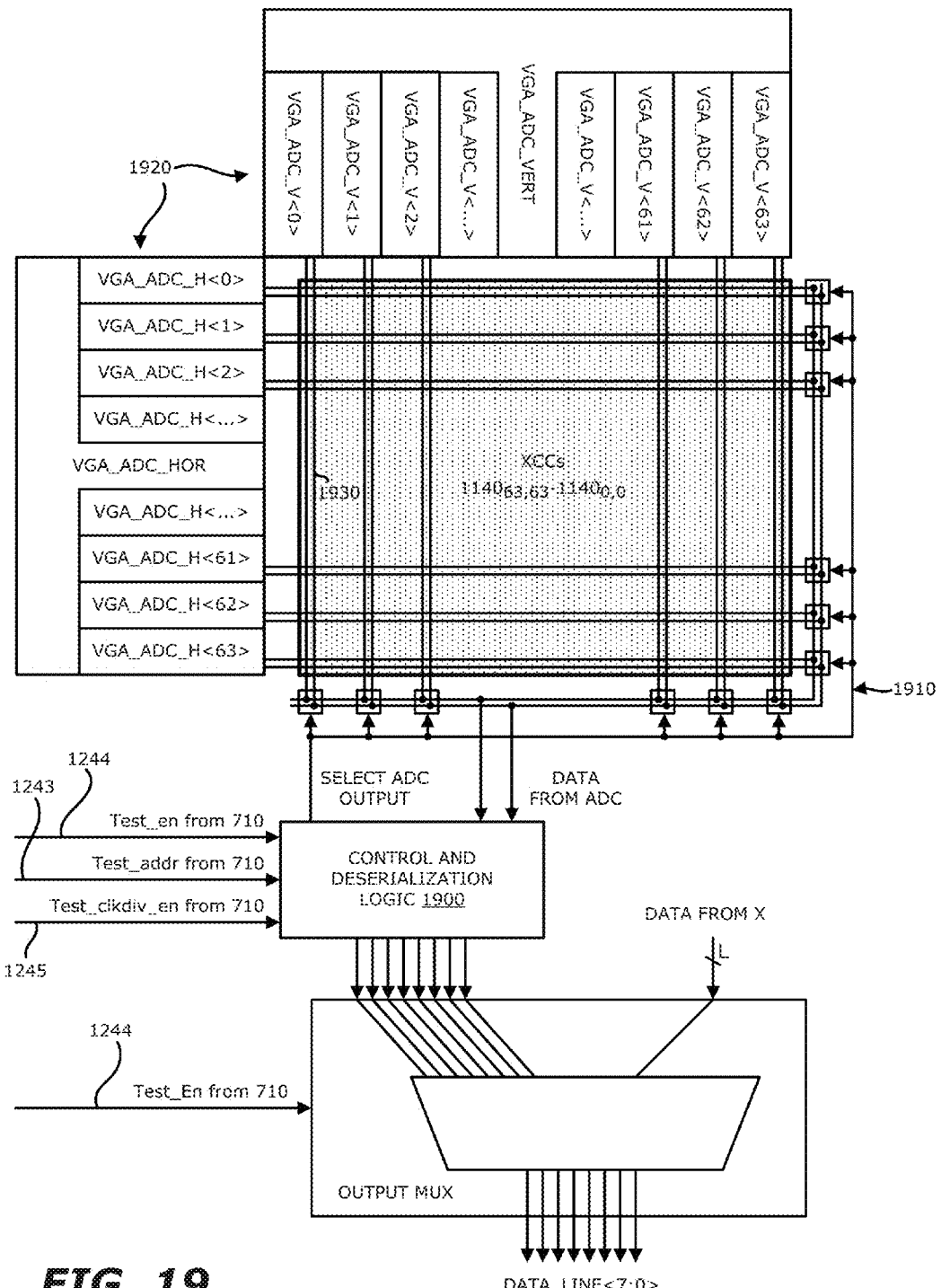
FIG. 19 is an exemplary embodiment of test architecture for testing a selected ADC is shown.

Referring now to FIG. 19, a test architecture is described in which iterative digital outputs from a selected ADC are read for subsequent output from the cross-correlation system. The address of the selected ADC is provided through Test_addr signaling 1243 provided to a control and deserialization logic 1900. In response to an "active" Test_en signal 1244 along with the Test_addr information 1243 from the controller 710, the logic 1900 enables corresponding switching logic 1910 to directly retrieve the two digital outputs from the selected ADC (e.g., ADC 1920) without the digital outputs traversing through the summing and cross-correlating matrix 740. Multiple retrievals (e.g. four retrievals in 4 CLK_2 cycles) from the selected ADC 1920 may be used to produce L-bits of data (e.g., L-bits being 8-bits for four retrievals in 4 CLK_2 cycles) subsequently read from some or all of a column of cross-correlation cells (XCCs) 1930 corresponding to ADC 1920. Another testing circuit is shown in FIG. 20.

Figure 20:
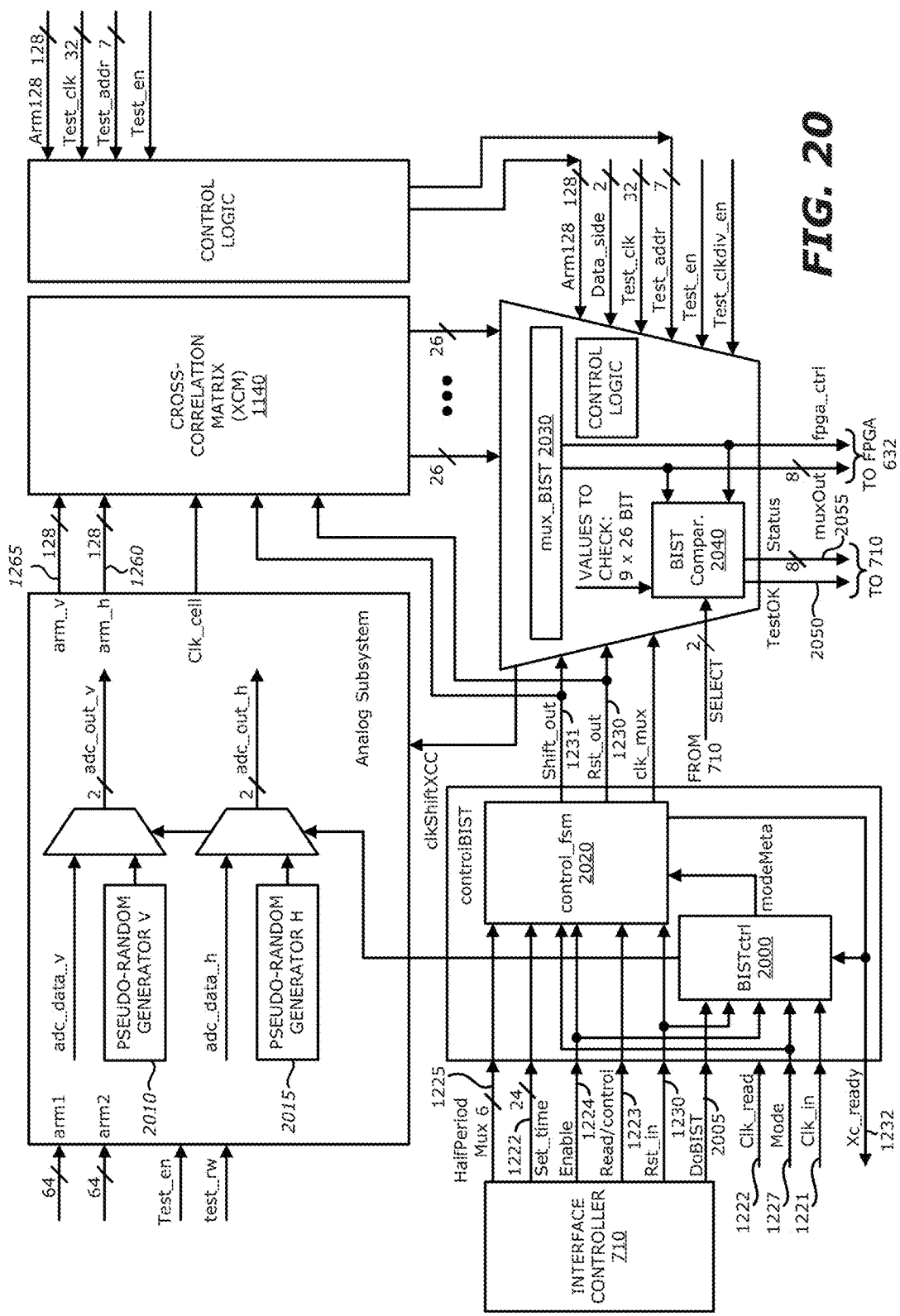
FIG. 20 is an exemplary embodiment of a cross-correlator deploying binary implemented self-test (BIST) logic.

Referring now to FIG. 20, another exemplary embodiment of the cross-correlator deploying binary implemented self-test (BIST) logic is shown. For this embodiment, a controller (BISTctrl) 2000 operating in cooperation with the interface controller 710 through activation of the DoBIST signal 2005 controls bit values from one or more pseudo-random generators 2010 and 2015 implemented within the analog subsystem 1200 to be manually fed into the cross-correlation matrix (XCM) 1140 via Arm_h 1260 and Arm_v 1265 outputs. The controller 2000 further controls control logic (control_fsm) 2020, which controls the cycling of the Shift_Out signal 1231, and thus, controls accumulation and reading of the digitized bit values produced by the analog subsystem 1200.

The interface controller 710 further activates a BIST comparator 2040 pre-programmed with a prescribed pattern of values to determine that the accumulated data received by a BIST multiplexer 2030 via certain cross-correlation cells (XCCs) corresponds to the prescribed pattern of values. If so, the TestOK signal 2050 is set to identify to the interface controller 710 that the XCCs are operating properly. Status data 2055 is provided to the interface controller 710 for subsequent forensics in the event that the testing is showing an error in the XCCs.

In the foregoing description, the invention is described with reference to specific exemplary embodiments thereof. For instance, ASIC may be a digital signal processor that includes the digitizer and cross-correlation circuitry on the same chip. It will, however, be evident that various modifications and changes may be made thereto without departing from the broader spirit and scope of the invention as set forth in the appended claims.

What is claimed is:
1. A cross-correlator comprising:
    a plurality of analog front ends, each of the plurality of front ends comprises a variable gain amplifier that receives and modifies a unique analog signal associates with a measured analog radio frequency (RF) signal and an analog-to-digital converter that produces digital data associated with the modified analog signal;
    a cross-correlation circuit communicatively coupled to the plurality of analog front ends, the cross-correlation circuit performs a cross-correlation operation on the digital data produced from different measured analog RF signals, wherein the cross-correlation circuit comprises
a plurality of first summing logic in communication with a first plurality of analog front ends of the plurality of analog front ends,
a plurality of second summing logic in communication with a second plurality of analog front ends of the plurality of analog front ends, and
a cross-correlation matrix, wherein the cross-correlation matrix comprises a plurality of cross-correlation cells, each of the plurality of cross-correlation cells uniquely performs a cross-correlation operation on the digital data produced from different receivers associated with the different sources,
wherein the plurality of first summing logic comprises a plurality of horizontal totalizers that are communicatively coupled to a first plurality of cross-correlation cells associated with the cross-correlation matrix, each of the plurality of horizontal totalizers includes a look-up table, a first plurality of accumulators and a first plurality of ripple counters, the first plurality of accumulators are oriented in parallel and each coupled to a corresponding ripple counter of the plurality of ripple counters; and
a data serializer communicatively coupled to the summing and cross-correlating matrix continuously outputs a prescribed amount of the correlated digital data.

2. The cross-correlator of claim 1, wherein at least a first cross-correlation cell of the plurality of cross-correlation cells comprises a look-up table, an accumulator and a ripple counter, the look-up table of the first cross-correlation cell operates to produce an output representative of a correlation between a first digital datum of the digital data that includes an RF component from a first source and a second digital datum of the digital data that includes an RF component from a second source different than the first source.

3. The cross-correlator of claim 1, wherein the first plurality of cross-correlation cells oriented as a first column of the cross-correlation matrix.

4. The cross-correlator of claim 1, wherein the plurality of second summing logic comprises a plurality of vertical totalizers that are communicatively coupled to a second plurality of cross-correlation cells associated with the cross-correlation matrix, each of the plurality of vertical totalizers includes a look-up table, a second plurality of accumulators and a second plurality of ripple counters, the second plurality of accumulators are oriented in series and each coupled to a corresponding ripple counter of the plurality of ripple counters.

5. The cross-correlator of claim 4, wherein the second plurality of cross-correlation cells oriented as a first row of the cross-correlation matrix.

6. The cross-correlator of claim 4, wherein each of the first plurality of accumulators and the second plurality of accumulators includes an adder with carry.

7. A cross-correlator comprising:
a plurality of analog front ends, each of the plurality of front ends comprises a variable gain amplifier that receives and modifies a unique analog signal associates with a measured analog radio frequency (RF) signal and an analog-to-digital converter that produces digital data associated with the modified analog signal;
a cross-correlation circuit communicatively coupled to the plurality of analog front ends, the cross-correlation circuit performs a cross-correlation operation on the digital data produced from different measured analog RF signals,
wherein the cross-correlation circuit comprises
a plurality of first summing logic in communication with a first plurality of analog front ends of the plurality of analog front ends,
a plurality of second summing logic in communication with a second plurality of analog front ends of the plurality of analog front ends, and
a cross-correlation matrix, wherein the cross-correlation matrix comprises a plurality of cross-correlation cells, each of the plurality of cross-correlation cells uniquely performs a cross-correlation operation on the digital data produced from different receivers associated with the different sources,
wherein each cross-correlation cell of the cross-correlation matrix detects a degree of correlation between the digital data that is represented by a resultant value and generates a count value representing a number of occurrences of the resultant value when the cross-correlation matrix is operating in a first mode and reads out the count value when the cross-correlation matrix is operating in a second mode.

8. The cross-correlator of claim 7, wherein the count value for each of a first plurality of cross-correlation cells of the plurality of cross-correlation cells propagates the count value through a second plurality of cross-correlation cells of the plurality of cross-correlation cells when the cross-correlation matrix is operating in the second mode.

9. The cross-correlator of claim 1, wherein the plurality of analog front ends, the cross-correlation circuit and the data serializer are implemented on a single integrated circuit chip.

10. A cross-correlation system, comprising:
a plurality of cross-correlators, including at least a first cross-correlator and a second cross-correlator;
a first interconnect coupled to the first cross-correlator, the first interconnect to provide, as an input to the first cross-correlator, a first component recovered from an analog radio frequency (RF) signal detected and processed by a first receiver; and
a second interconnect coupled to the first cross-correlator, the second interconnect to provide, as an input to the first cross-correlator, a second component recovered from the analog RF signal detected and processed by a second receiver different than the first receiver,
wherein the first cross-correlator comprises:
a plurality of analog front ends, each of the plurality of front ends comprises a variable gain amplifier that receives and modifies an analog signal associates with a measured analog radio frequency (RF) signal and an analog-to-digital converter that produces digital data associated with the modified analog signal,
a cross-correlation circuit communicatively coupled to the plurality of analog front ends, the cross-correlation circuit performs a cross-correlation operation on the digital data produced from different measured analog RF signals, wherein the cross-correlation circuit of the first cross-correlator comprises
a plurality of first summing logic in communication with a first plurality of analog front ends of the plurality of analog front ends, a plurality of second summing logic in communication with a second plurality of analog front ends of the plurality of analog front ends, and a cross-correlation matrix, wherein the cross-correlation matrix of the first cross-correlator comprises a plurality of cross-correlation cells, each of the plurality of cross-correlation cells uniquely performs a cross-correlation operation on the digital data produced from different receivers associated with the different sources, wherein at least a first cross-correlation cell of the plurality of cross-correlation cells of the first cross-correlator comprises a look-up table, an accumulator and a ripple counter, the look-up table of the first cross-correlation cell operates to produce an output representative of a correlation between a first digital datum of the digital data that includes an RF component from a first source and a second digital datum of the digital data that includes an RF component from a second source different than the first source, wherein the plurality of first summing logic of the first cross-correlator comprises a plurality of horizontal totalizers that are communicatively coupled to a first plurality of cross-correlation cells associated with the cross-correlation matrix, each of the plurality of horizontal totalizers includes a look-up table, a first plurality of accumulators and a first plurality of ripple counters, the first plurality of accumulators are oriented in parallel and each coupled to a corresponding ripple counter of the plurality of ripple counters, and a data serializer communicatively coupled to the summing and cross-correlating matrix continuously outputs a prescribed amount of the correlated digital data.

11. The cross-correlation system of claim 10, wherein the first component is an I component associated with the analog RF signal processed by the first receiver and the second component is a Q component associated with the analog RF signal processed by the second receiver.

12. The cross-correlation system of claim 10, wherein
the first plurality of cross-correlation cells oriented as a first column of the cross-correlation matrix,
the plurality of second summing logic of the first cross-correlator comprises a plurality of vertical totalizers that are communicatively coupled to a second plurality of cross-correlation cells associated with the cross-correlation matrix, each of the plurality of vertical totalizers includes a look-up table, a second plurality of accumulators and a second plurality of ripple counters, the second plurality of accumulators are oriented in series and each coupled to a corresponding ripple counter of the plurality of ripple counters, and
the second plurality of cross-correlation cells oriented as a first row of the cross-correlation matrix.

\* \* \* \* \*